United States Patent [19]

Shikichi

[11] Patent Number: 5,475,660
[45] Date of Patent: Dec. 12, 1995

[54] OPTICAL INFORMATION RECORDING-REPRODUCING METHOD AND APPARATUS INCLUDING FOCUSING AND/OR TRACKING CONTROL DEPENDING ON A DETERMINED STATE OF AN OPTICAL SPOT

[75] Inventor: Satoshi Shikichi, Tokyo, Japan

[73] Assignee: Canon Kabushiki Kaisha, Tokyo, Japan

[21] Appl. No.: 22,157

[22] Filed: Feb. 23, 1993

[30] Foreign Application Priority Data

Feb. 25, 1992 [JP] Japan .................................. 5-038021

[51] Int. Cl.[6] .............................. G11B 17/22; G11B 7/00
[52] U.S. Cl. ...................... 369/32; 369/44.25; 369/44.35
[58] Field of Search ........................... 369/32, 13, 44.11, 369/44.29, 44.35, 44.27, 44.25, 124, 44.32, 44.41, 44.14, 112, 54, 48; 360/77.02; 250/201.5

[56] References Cited

U.S. PATENT DOCUMENTS

| | | | |
|---|---|---|---|
| 4,542,491 | 9/1985 | Takasago et al. | 369/44.29 |
| 4,627,041 | 12/1986 | Uemura | 369/44.29 |
| 4,636,625 | 1/1987 | Emoto et al. | 369/44.29 X |
| 4,769,801 | 9/1988 | Funada et al. | 369/44.29 |
| 5,029,151 | 7/1991 | Shikichi | 369/44.35 |
| 5,086,420 | 2/1992 | Doi | 369/44.25 |
| 5,146,442 | 9/1992 | Shikichi | 369/44.29 |
| 5,151,888 | 9/1992 | Shikichi et al. | 369/44.32 |
| 5,157,644 | 10/1992 | Rokutan | 369/4.11 |
| 5,282,184 | 1/1994 | Takikita | 369/44.25 |

FOREIGN PATENT DOCUMENTS

| | | |
|---|---|---|
| 0096969 | 12/1983 | European Pat. Off. |
| 0209146 | 1/1987 | European Pat. Off. |
| 2126379 | 3/1984 | United Kingdom |

*Primary Examiner*—Ali Neyzari
*Attorney, Agent, or Firm*—Fitzpatrick, Cella, Harper & Scinto

[57] ABSTRACT

In an optical information recording-reproducing apparatus or method, a sum signal is generated from a divided sensor to be used for auto-focus (AF) and/or auto-tracking (AT) control. The AF servo is closed after an objective lens is moved to a location in the neighborhood of an in-focus position while working a position servo for an objective lens actuator using the sum signal. Further, the fact that a light spot is on a track is detected from the sum signal. If this fact is detected as well as the fact that a tracking error signal is in the neighborhood of zero, the AT servo is closed.

7 Claims, 25 Drawing Sheets

FIG.12A  J  
FIG.12B  P  
FIG.12C  K  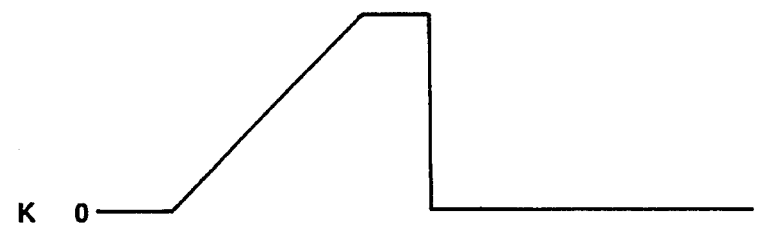
FIG.12D  O  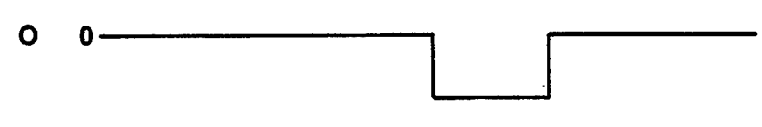
FIG.12E  I
         H  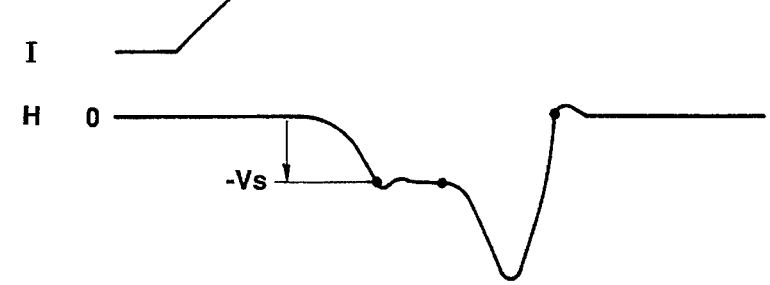

OPTICAL INFORMATION RECORDING-REPRODUCING METHOD AND APPARATUS INCLUDING FOCUSING AND/OR TRACKING CONTROL DEPENDING ON A DETERMINED STATE OF AN OPTICAL SPOT

BACKGROUND OF THE INVENTION

1. Field of the Invention

The present invention relates to an optical data or information recording-reproducing method and an apparatus using the method. More particularly, the present invention relates to an optical information recording-reproducing method and an apparatus using the method in which a light spot is moved relative to a track of an optical information recording medium, while auto-tracking (AT) and auto-focusing (AF) of the spot relative to the recording medium are performed in order to record information on the medium and to reproduce and/or erase information recorded in the medium.

2. Related Background Art

Conventionally, various kinds of media, such as a disc card, tape or other types, have been known as optical information recording media. Information or recorded information in or from an optical information recording medium is recorded or reproduced using a light beam. Among them, card-shaped optical information recording media (hereinafter referred to as an optical card) are expected to be in a great demand because the information recording medium is small in size, light in weight, easy to carry and has a large recording capacity. FIG. 2 is a schematic plan view illustrating the structure of an optical card.

In FIG. 2, an optical card 101 is provided with an information or data recording area 102 at both opposite ends of which track selection areas 104a and 104b are formed. A plurality of information tracks 103 are arranged in a portion of the data recording area 102 and the track selection areas 104a and 104b. Information or data is recorded on the data tracks 103. Reference numeral 105 designates a home position of a light spot.

The optical card 101 is scanned with a light beam that is modulated based on recording data and condensed into a minute spot, and data or information is recorded in the optical card 101 as an array of optically detectable record pits or a data track.

At this time, in order to accurately record data without any trouble, such as the intercrossing of data tracks, it is necessary to control the irradiation position of the light spot on the optical card 101 in a direction orthogonal to a scanning direction. This control is termed auto-tracking and will hereinafter be referred to as AT. Further, in order to apply a light beam as a stable minute spot irrespective of warps of the optical card 101 and mechanical errors, it is necessary to control the light spot in a direction perpendicular to the surface of the optical card 101. This control is termed auto-focusing, and will be referred to as AF hereinbelow. Those AT and AF are also needed at the time of data reproduction.

FIG. 1 shows an example of an optical information recording-reproducing apparatus.

In FIG. 1, reference numeral 106 designates a motor for moving the optical card 101 in the directions indicated by arrows. Reference numeral 107 designates a light source such as a semiconductor laser. Reference numeral 108 designates a collimator lens for collimating a light beam from the light source 107. Reference numeral 109 designates a beam splitter, and reference numeral 110 designates an objective lens. Reference numeral 111 designates a coil for tracking control. Reference numeral 112 designates a coil for focusing control. Reference numerals 113 and 114 respectively designate condenser lenses. Reference numerals 115 and 116 respectively designate photoelectric conversion elements. Reference numeral 117 designates a tracking control circuit, and reference numeral 118 designates a focusing control circuit. In response to instructions or commands from the control circuits 117 and 118, currents are caused to flow in the tracking coil 111 and in the focusing coil 112 respectively. These instructions or commands are based on tracking and focusing signals detected by the photoelectric conversion elements 115 and 116, and cause the objective lens 110 to be properly moved. Thus, AT and AF are accomplished.

Further, reference numeral 119 designates a system controller for controlling the information recording-reproducing apparatus, and reference numeral 120 designates a group of various control signals output from the controller 119. Although signals other than the control signal group 120 as shown in FIG. 1 are output from the controller 119, they are not illustrated in FIG. 1. There are further shown an optical head 121 and a driving motor 122 for moving the optical head 121 in a direction u as indicated in FIG. 2.

A light beam from the light source 107 is collimated by the collimator lens 108, and after passing the beam splitter 109, the collimated beam is condensed onto the recording track of the optical card 101 by the objective lens 110. Light reflected by the recording track is in turn passed through the beam splitters 109 and split into two beams. These beams are respectively condensed onto the photoelectric conversion element 115, for detecting a tracking signal, and the photoelectric conversion element 116, for detecting a focusing signal, by the condenser lenses 113 and 114. The signals obtained by the respective photoelectric conversion elements 115 and 116 function as a tracking error signal and a focusing error signal in the tracking and focusing control circuits 117 and 118 to cause currents to flow into the tracking and focusing coils 111 and 112. Thus, the objective lens 110 is moved to achieve AT and AF.

FIG. 3 is a schematic view showing the structure of the focusing control circuit 118 shown in FIG. 1.

In FIG. 3, reference numeral 201 designates an amplifier for amplifying an electric focusing signal from the photoelectric conversion element 116 to a proper voltage. Reference numeral 203 designates an analog switch. An output of the amplifier 201 is input into one input terminal of the analog switch 203 while an output of an adder or summing circuit 208 is input into the other input terminal of the analog switch 203 through a point C. A signal from a focusing controller 205 selects one of the input terminals of the analog switch 203. Reference numeral 206 designates a circuit for generating a triangle wave and is referred to as a TW circuit. Reference numeral 207 designates a circuit for generating a square wave and is referred to as an SW circuit. The outputs of the SW and TW circuits are added up in the adder circuit 208. Reference numeral 204 designates a driver, and the driver 204 causes a driving signal current to flow into the focusing coil 112, in response to a signal from the analog switch 203. Reference numeral 205 designates a focusing controller for controlling the entire focusing control circuit 118 in response to the signal 120 from the system controller 119. Although the signal of the focusing controller 205 is input solely into the analog switch 203 as shown in FIG. 3, signals other than those shown in FIG. 3 are output from the focusing controller 205. These other signals from the focusing controller 205 are not shown in FIG. 3.

FIGS. 4A and 4B are respectively graphs illustrating changes in voltages at points C and A of the focusing control circuit 118 shown in FIG. 3.

The draw-in or closure of a focusing servo will be described with reference to FIGS. 3, 4A and 4B.

Initially, as shown in FIG. 3, the A point side of the analog switch 203 is brought into an open state and the C point side thereof is brought into a closed state, in response to the signal D from the focusing controller 205. Hence, the objective lens 110 is moved by an output from the adder circuit 208.

In the case when a portion for driving the objective lens 110 is of a sliding type (its elastic modulas is negligible), a force needed to start the motion of the objective lens 110 (i.e., this force is a drag due to its static friction) is large, as compared with a force needed to continue the motion of the objective lens 110 (i.e., this force is nearly a drag against its kinetic friction). In this case, if the objective lens 110 was moved solely by the TW circuit 206, the motion of the lens 110 would be irregular. Therefore, normally, the objective lens 110 is moved while always being reciprocated by a minute amount, using a voltage that has a shape as shown in FIG. 4A. This shape is produced by overlapping an output of the SW circuit 207 upon the triangle wave output of the TW circuit 206. Thus, the static friction is diminished.

In the above-discussed apparatus, when the objective lens 110 is moved and the focal point of the objective lens 110 is nearly brought onto the surface of the optical card 101, a voltage at the point A varies in a form of a letter S (a so-called S letter curve) as shown in FIG. 4B. Herein, in order to draw in or close the servo, the focusing controller 205 detects the fact that the voltage at the point A comes to zero (0) V at a time of $t_5$. As a result, the focusing controller 205 supplies the signal D to the analog switch 203 to close the A point side and open the C point side. Thus, the focusing servo is drawn in.

FIG. 5 is a schematic view showing the structure of the tracking control circuit 117 shown in FIG. 1.

In FIG. 5, reference numeral 211 designates an amplifier for amplifying an electric tracking signal from the photoelectric conversion element 115 to a proper voltage. Reference numeral 213 designates an analog switch into one input terminal of which an output of the amplifier 211 is input through a point E and into the other input terminal of which an output of a triangle wave generating circuit or TW circuit 216 is input through a point F. One of the input terminals of the analog switch 213 is selected by a signal from the tracking controller 215. Reference numeral 214 designates a driver which causes a driving signal current to flow into the tracking coil 111 in response to a signal from the analog switch 213. Reference numeral 215 designates a tracking controller for controlling the entire tracking control circuit 117 in response to a signal 120 from the system controller 119. In FIG. 5, only a signal input from the tracking controller 215 into the analog switch 213 is indicated, but other signals (not shown) are also output from the tracking controller 215.

FIGS. 6A and 6B are respectively graphs illustrating changes in voltages at points F and E of the tracking control circuit 117, shown in FIG. 5.

The draw-in of the tracking servo will be described with reference to FIGS. 5, 6A and 6B.

Initially, as shown in FIG. 5, the E point side of the analog switch 213 is brought into an open state and the F point side thereof is brought into a closed state in response to a signal G from the tracking controller 215. Hence, the objective lens 110 is moved by an output from the TW circuit 216.

In the above-discussed apparatus, when the objective lens 110 is moved and the light spot intersects the track of the optical card 101, a signal E varies in a form of a letter S (a so-called S letter curve) as shown in FIG. 6B. Herein, the light spot is located on the track at a time of $t_0$ at which the signal E initially becomes zero after this signal has passed a voltage of $+V_{th}$. Therefore, the tracking servo can be drawn in by the tracking controller 215 detecting such a fact and then supplying the signal G to the analog switch 213 to close the E point side and open the F point side thereof.

The above-described prior art apparatus, however, has the following drawbacks:

First, in the draw-in of the focusing servo, if vibrations are imparted from outside at the time of the draw-in, the objective lens 110 is vibrated and the relative speed between the objective lens 110 and the optical card 101 becomes great at $t_5$. Therefore, even if the servo is closed, the light spot deviates from an in-focus state.

Second, in the draw-in of the tracking servo, if vibrations are imparted from outside at the time of the draw-in, the objective lens 110 is swayed relatively to the optical card 101. Further, after the signal E has passed $+V_{th}$, the light spot is reversely moved due to the vibrations, as shown by an arrow in FIG. 7, and the signal E becomes zero at a position $X_1$ where the light spot is derailed from the track. Therefore, the servo is closed at this point, and as a result, AT cannot be drawn in at a regular draw-in position.

SUMMARY OF THE INVENTION

It is an object of the present invention to provide an optical information recording-reproducing method and an apparatus using the method in which an accurate draw-in of a servo is achieved at the time of draw-in of a focusing or tracking servo, even if vibrations are imparted from outside.

The object is attained by an optical information recording-reproducing method in which a light spot is applied through an objective lens onto an optical information recording medium and the light spot is moved relative to the recording medium while focusing control is conducted so that at least one of recording, reproducing and erasing of information is effected on the recording medium and which includes a step of receiving light reflected from the recording medium by a divided sensor, a step of adding up at least a portion of output signals of the divided sensor to generate a sum signal, a step of moving the objective lens in its optical axis direction with a position servo, which is operative in accordance with the sum signal, at the time of a draw-in of the focusing control and a step of operating the focusing control after the moving step of the objective lens.

Further, the object is attained by an optical information recording-reproducing method in which a light spot is applied through an objective lens onto an optical information recording medium, which has a plurality of tracks, and the light spot is moved relative to the recording medium while tracking control is conducted so that at least one of recording, reproducing and erasing of information is effected on the recording medium and which includes a step of receiving light reflected from the recording medium by a divided sensor, a step of adding at least a portion of output signals of the divided sensor to generate a sum signal, a step of detecting whether the light spot is located on one of the tracks, using the sum signal, at the time of a draw-in of the tracking control, a step of generating a tracking error signal in accordance with the output signals of the divided sensor, a step of comparing the tracking error signal with a predetermined value and a step of operating the tracking control based on a comparison result obtained in the comparing step and a detection result obtained in the detecting step, at the time of the draw-in of the tracking control.

Further, the object is attained by an optical information recording-reproducing apparatus in which a light spot is applied through an objective lens onto an optical information recording medium and the light spot is moved relative to the recording medium while focusing control is conducted so that at least one of recording, reproducing and erasing of information is effected on the recording medium and which comprises a divided sensor for receiving light reflected from the recording medium and for producing output signals, adding means for receiving the output signals from the divided sensor and for adding at least a portion of the output signals to generate a sum signal, driving signal generating means for generating a predetermined driving signal for moving the objective lens in its optical axis direction, a position servo circuit for receiving the sum signal and the drive signal and for moving the objective lens in its optical axis direction in accordance with these signals and for generating a position servo circuit control signal, focusing error signal generating means for receiving the output signals of the divided sensor and for generating a focusing error signal in accordance with the output signals, a focusing control circuit for receiving the focus error signal and for driving the objective lens so that the light spot is in an in-focus state on the recording medium and for generating a focusing control circuit control signal, and selecting means for receiving the position servo circuit and focusing control circuit control signals and for rendering inoperative the focusing control circuit when the position servo circuit is operative, while rendering inoperative the position servo circuit when the focusing control circuit is operative, at the time of a draw-in of the focusing control.

Further, the object is attained by an optical information recording-reproducing apparatus in which a light spot is applied through an objective lens onto an optical information recording medium, which has a plurality of tracks, and the light spot is moved relative to the recording medium while tracking control is conducted so that at least one of recording, reproducing and erasing of information is effected on the recording medium and which comprises a divided sensor for receiving light reflected from the recording medium and for producing output signals, sum signal generating means for receiving the output from said divided sensor and for adding at least a portion of the output signals to generate a sum signal, tracking error signal generating means for generating a tracking error signal in accordance with the output signals of the divided sensor, a tracking control circuit for receiving the sum signal and the tracking error signal and for moving the objective lens so that the light spot is located on the track in accordance with these signals, detecting means for receiving the sum signal and for detecting if the light spot is located on the track in accordance with the sum signal and for generating a detection result, comparing means for receiving the tracking error signal and for comparing the tracking error signal with a predetermined value and for generating a comparison result, and control means for making operative the tracking control circuit based on the comparison result obtained by the comparing means and the detection result obtained by the detecting means, at the time of a draw-in of the tracking control.

These advantages and others will be more readily understood in connection with the following detailed description of the preferred embodiments taken in conjunction with the drawings.

BRIEF DESCRIPTION OF THE DRAWINGS

FIGS. 12A, 12B, 12C, 12D, 12E and 12F are respectively timing charts of different signals in the appparatus shown in FIG. 11.

DESCRIPTION OF THE PREFERRED EMBODIMENT

First Embodiment

Figure 1:
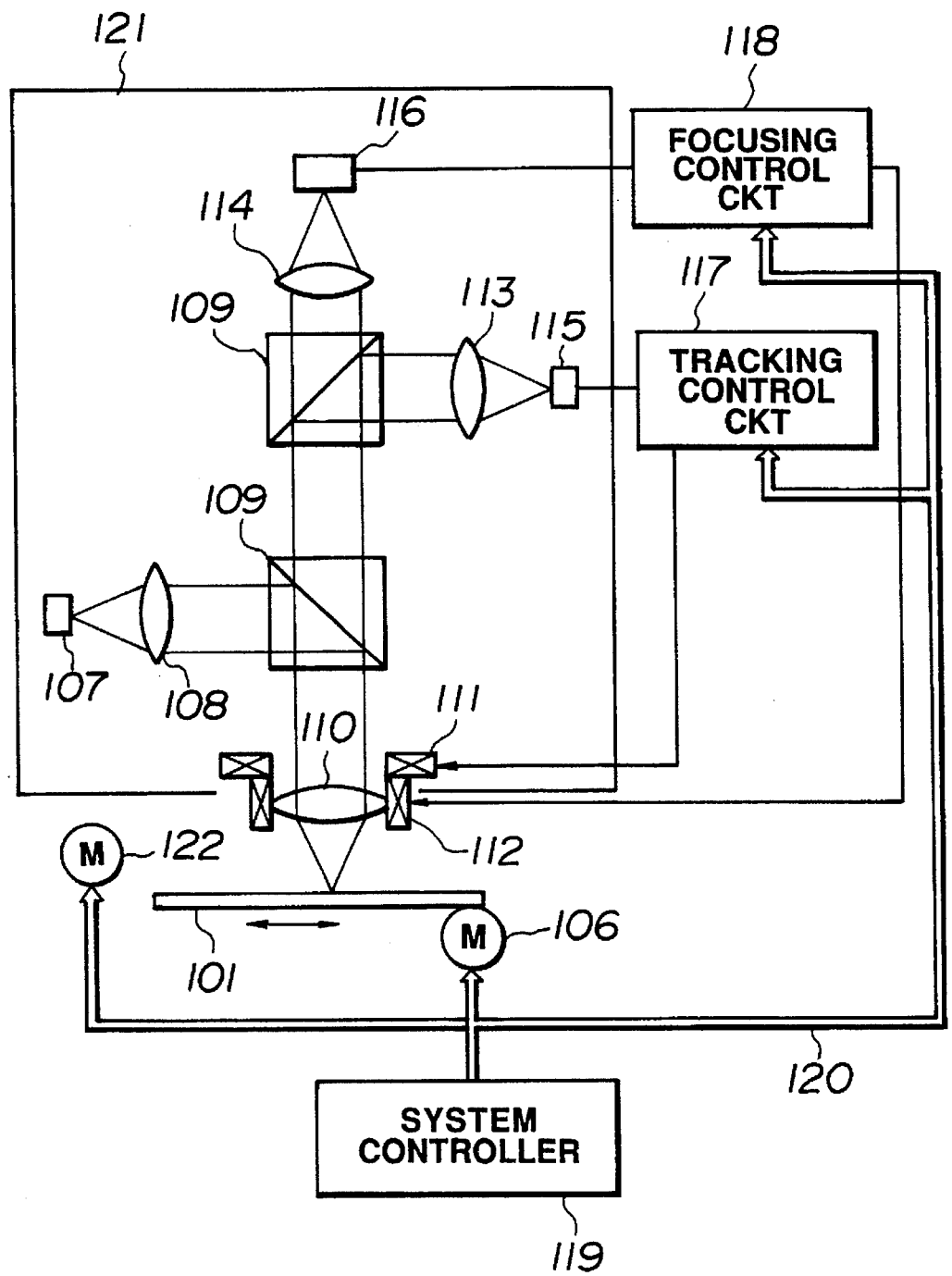
FIG. 1 is a schematic view showing the structure of a prior art optical information recording-reproducing apparatus.
Figure 2:
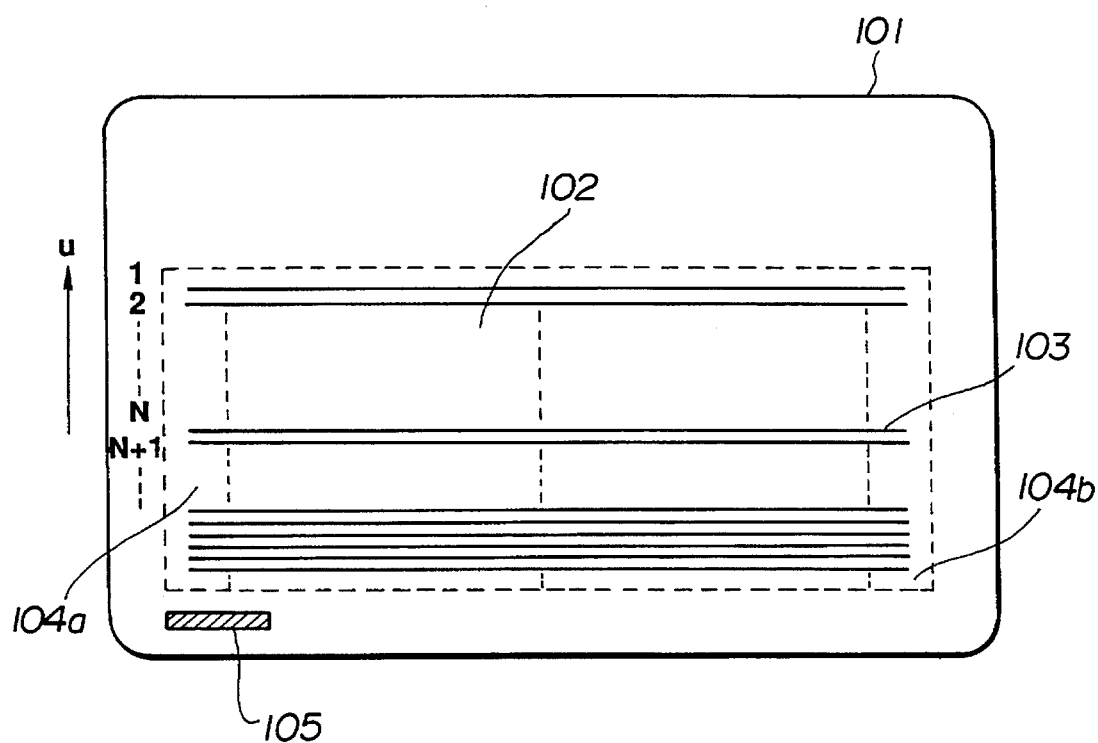
FIG. 2 is a plan view of an optical card.
Figure 3:
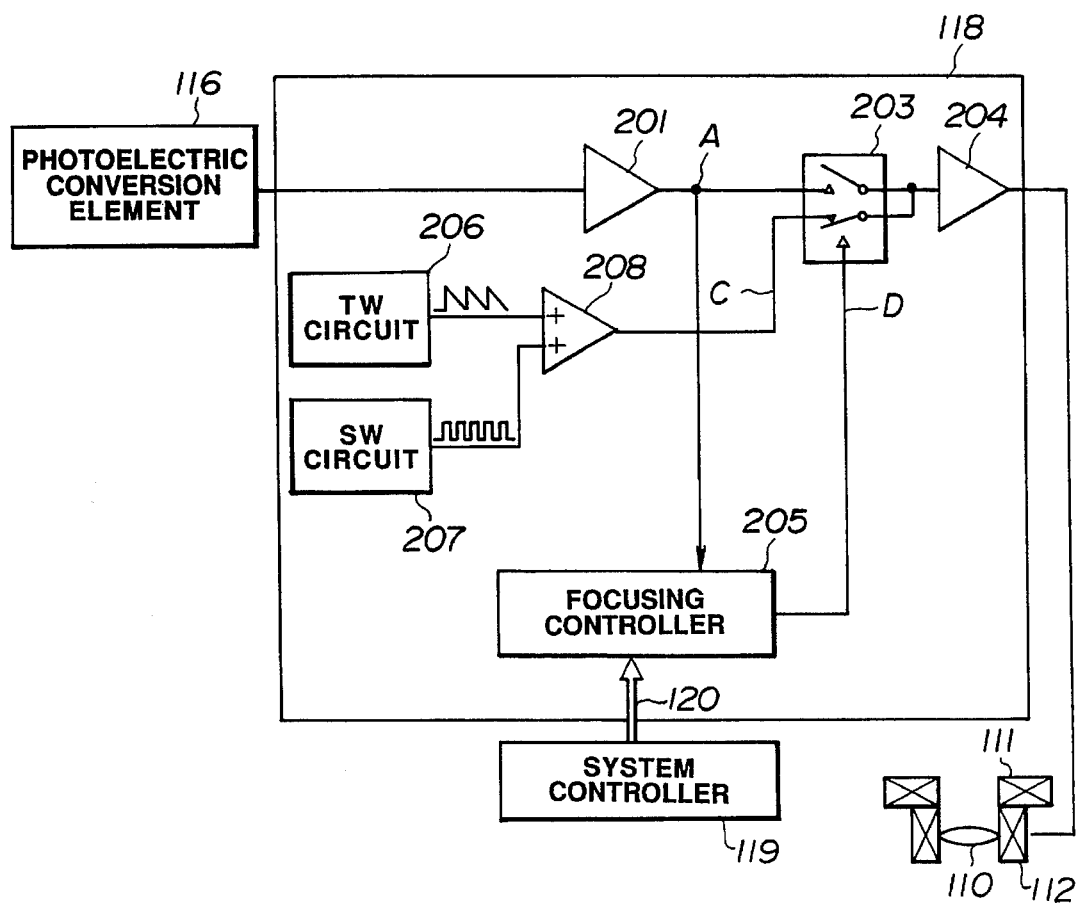
FIG. 3 is a view showing the structure of a focusing control circuit of the apparatus shown in FIG. 1.
Figure 4A:
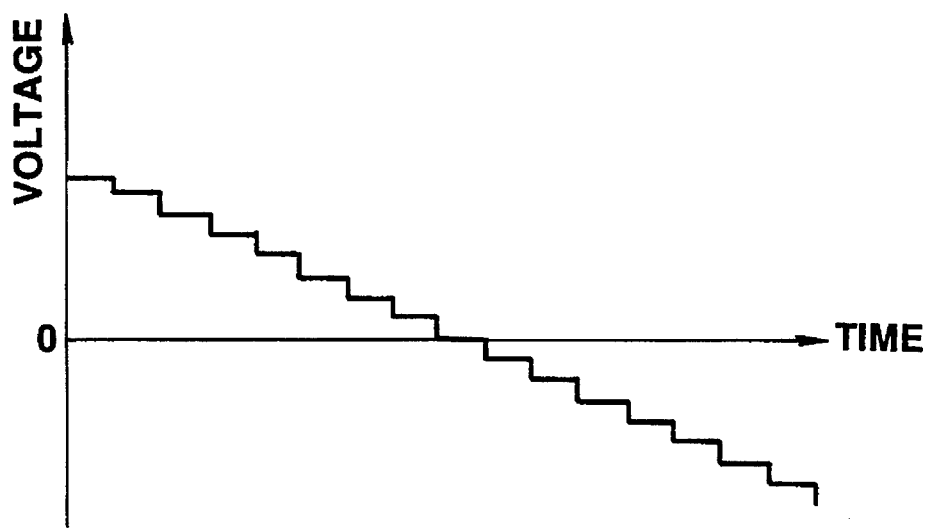
FIGS. 4A and 4B are respectively graphs illustrating changes in signals at different points of the circuit illustrated in FIG. 3.
Figure 4B:
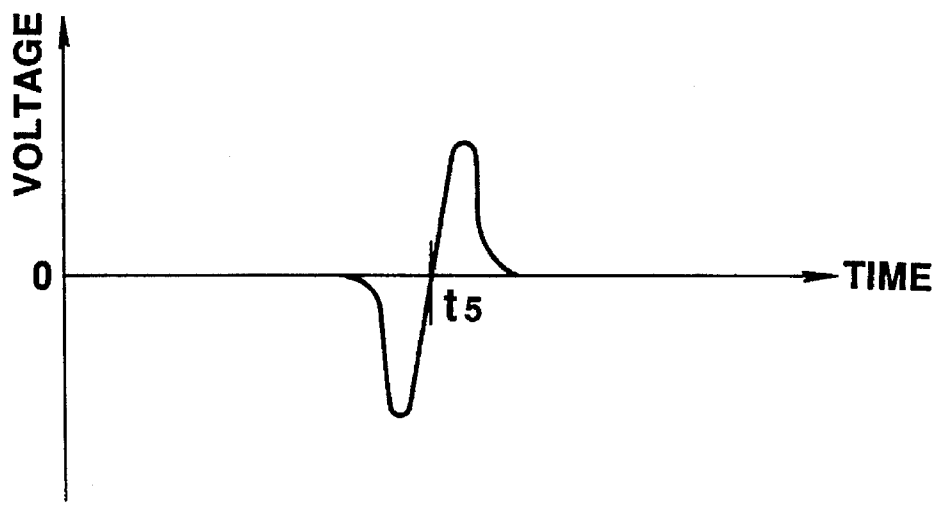
Figure 5:
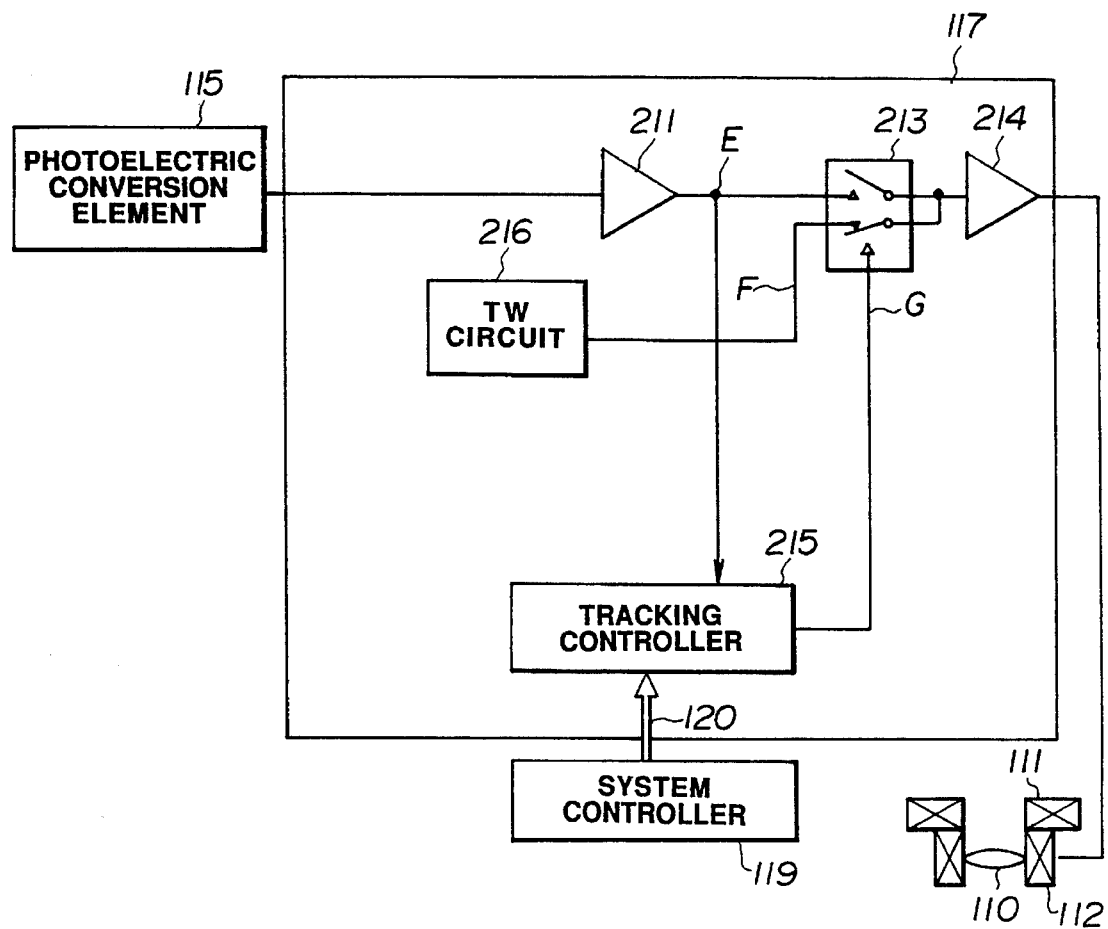
FIG. 5 is a view showing the structure of a tracking control circuit of the apparatus shown in FIG. 1.
Figure 6A:
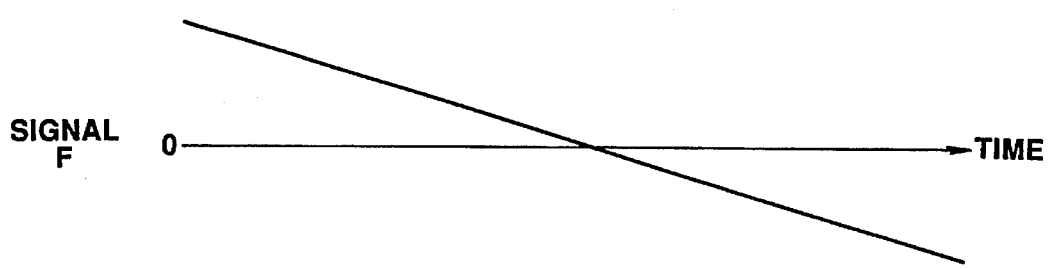
FIGS. 6A and 6B are respectively graphs illustrating changes in signals at different points of the circuit shown in FIG. 5.
Figure 6B:
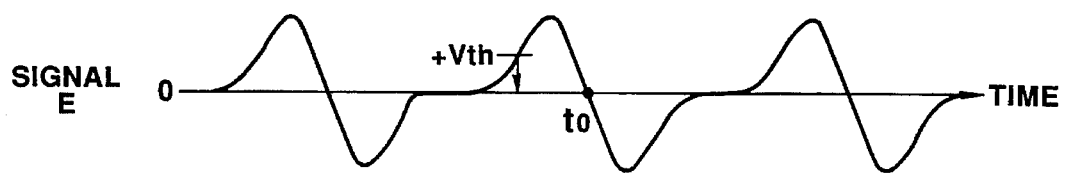
Figure 7:
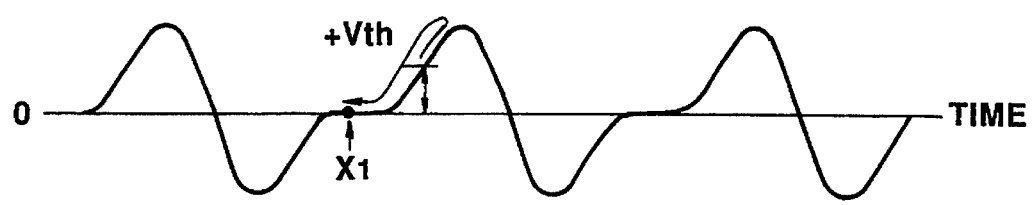
FIG. 7 is a graph explaining the problem of the circuit shown in FIG. 5.
Figure 8:
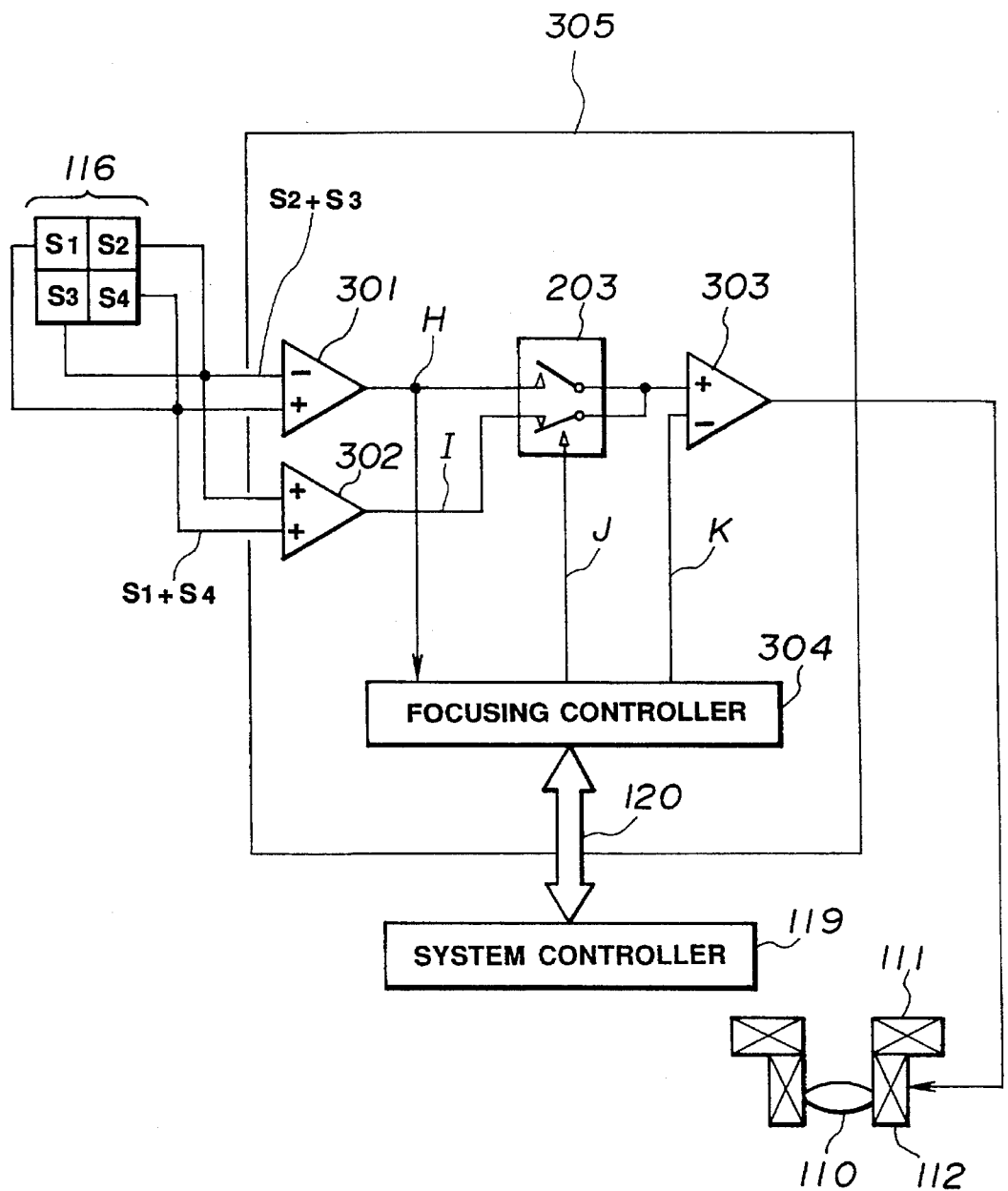
FIG. 8 is a view showing a first embodiment of an optical information recording-reproducing method and an apparatus using the method according to the present invention.

A preferred first embodiment according to the present invention will be described with reference to FIGS. 8, 9A–9C and 10A–10D. FIG. 8 shows the structure of a focusing control circuit for an optical information recording-reproducing method and an apparatus using the method of the present invention. FIGS. 9A–9C and 10A–10D are respectively timing charts of the focusing control circuit shown in FIG. 8.

In FIG. 8, reference numeral 305 designates a focusing control circuit, reference numeral 301 designates a subtracter circuit reference numeral 302 designates an adder or summing circuit, reference numeral 303 designates another subtracter circuit and reference numeral 304 designates a focusing controller.

Figure 9:
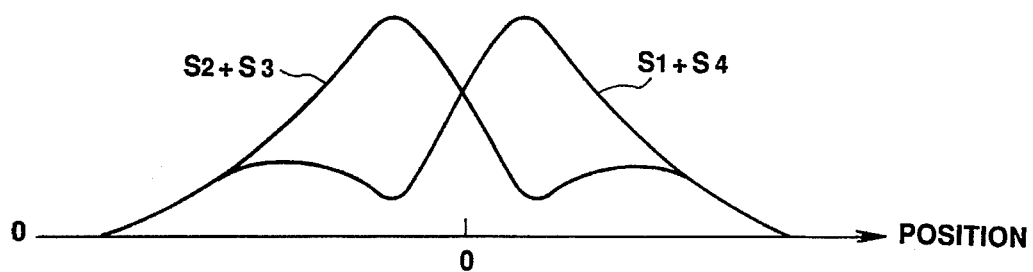
FIGS. 9A, 9B and 9C are respectively graphs illustrating changes in signals at different points of the apparatus shown in FIG. 8.
Figure 9:
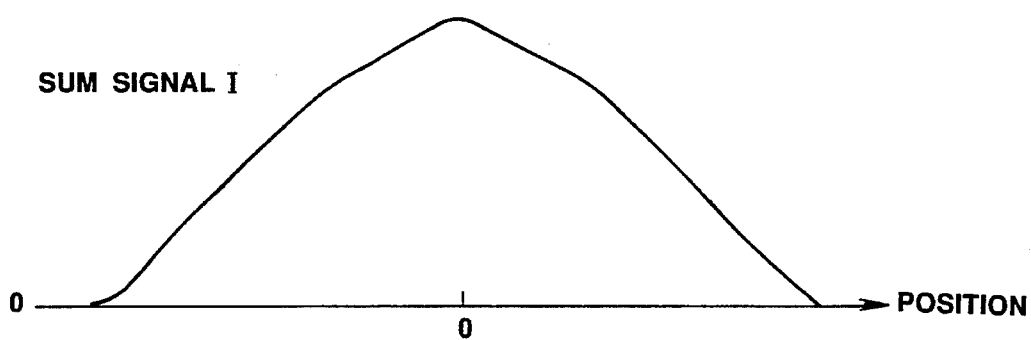
Figure 9:
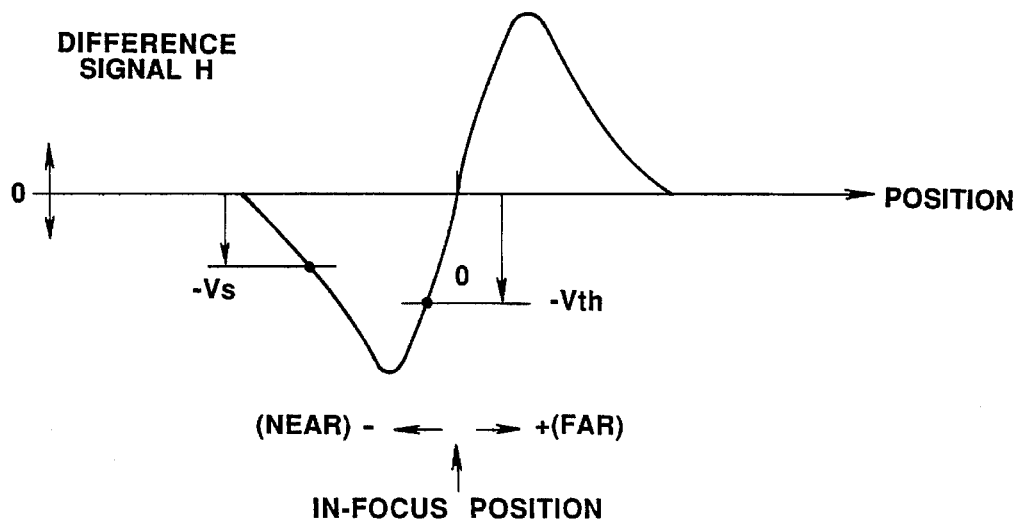

Initially, when an objective lens 110 is moved relative to an optical card 101, from a position close or near thereto, to a position remote or far therefrom, passing an in-focus state or position, signals $S_1+S_4$ and $S_2+S_3$ of a photoelectric conversion element (divided sensor) 116, its sum signal I and its difference signal H respectively vary as illustrated in FIGS. 9A, 9B and 9C. When the objective lens 110 is positioned close to the optical card 101, signals $S_1+S_4$ and $S_2+S_3$ are respectively equal to zero (0) and the sum signal I and the difference signal H are also equal to zero (0). Then, as the objective lens 110 approaches the in-focus state, the signals $S_1+S_4$ and $S_2+S_3$ vary, as shown in FIG. 9A, the sum signal I increases and the difference signal H is changed to a negative (−) side. In the in-focus state of the objective lens 110, the sum signal I becomes maximum and the difference signal H comes to zero (0) again. In the state of the objective lens 110 being far from the optical card 101, the sum signal I decreases and the difference signal H decreases after having increased to a positive (+) side.

Figure 10A:
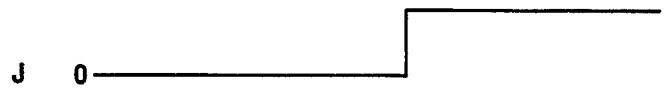
FIGS. 10A, 10B, 10C and 10D are respectively timing charts of different signals in the appparatus shown in FIG. 8.
Figure 10B:
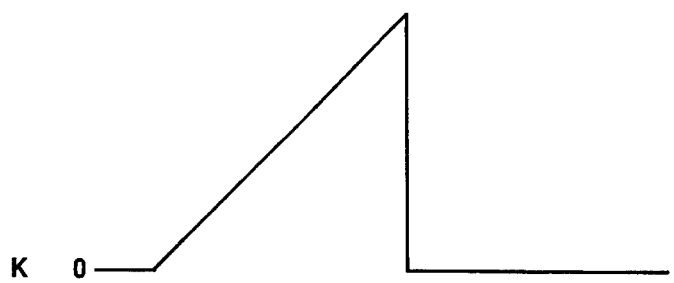
Figure 10C:
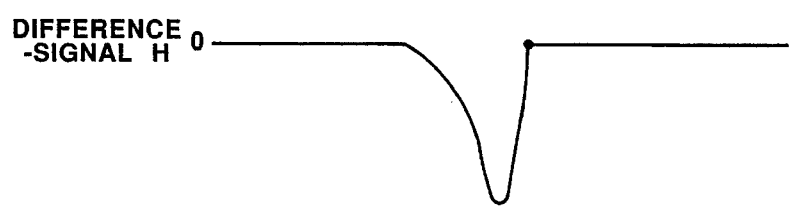

The AF servo draw-in process of the first embodiment will be described with reference to FIGS. 10A–10D. It is assumed that initially the objective lens 110 is close to the optical card 101, that the analog switch 203 selects the sum signal I prior to a time of $t_s$, as shown in FIG. 8 and FIG. 10C, and that the AF control circuit 305 is under a condition wherein the sum signal I is used to work or operate a position servo. Then, at a time of $t_s$ in FIG. 10B, the focusing controller 304 begins to gradually increase the level of a reference signal K from zero (0) in order to move the objective lens 110 to the in-focus position. The level signifies a voltage level. As a result, since the sum signal I is used and the position servo works as described above, the objective lens 110 begins to move and the sum signal I also gradually increases similar to the reference signal K. As shown in FIG. 9B, the increase of the sum signal I signifies that the objective lens 110 is moving from the close state to the in-focus state. At this time, any amount of movement of the objective lens 110, due to the vibrations from outside is very small because the position servo using the sum signal I is working.

Figure 10D:
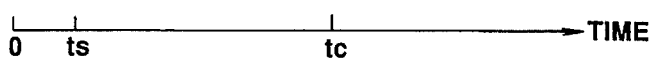

The focusing controller 304 detects, at a time $t_c$, a zero-cross detection (i.e., the fact that the difference signal H reaches zero (0) from the negative (−) side as shown in FIG. 10D, or that the objective lens 110 reaches the in-focus state), and the analog switch 203 selects the difference signal H in response to a signal J (see FIG. 10A) from the focusing controller 304. Thus, a position servo using the difference signal H, or AF servo state is established, and the draw-in of the AF servo is achieved.

Second Embodiment

As illustrated in FIGS. 9A through 9C of the first embodiment, a case where the inclination of the sum signal I, in the vicinity of in-focus state, greatly differs from that of the difference signal H, may occur depending on the structures of the optical system and the electric circuit of an optical information recording-reproducing apparatus. If the servo gain of the servo using the sum signal I differs from that of the servo using the difference signal H, bringing forth inconveniences, then both servo gains can be made equal to each other by a method in which the amplification factor of the subtracter circuit 303 is changed over, using the signal J from the focusing controller 304, or other methods.

Third Embodiment

In the first embodiment, the timing at which the servo is switched over using the difference signal H is a time at which the difference signal H comes to zero (0). However, other timings can be utilized.

For example, the same effect or technical advantage can also be obtained by switching over the kind of servo when the difference signal H gets to $-V_{th}$, as shown in FIG. 9C. In particular, in a case where the inclination of the sum signal I becomes extremely small near the in-focus state as shown in FIG. 9B, the servo gain of the position servo using the sum signal I is small in this area, while the amount of movement of the objective lens 110, due to the vibrations from outside, is large. In such a case, the method of the third embodiment is effective.

Fourth Embodiment

In the first embodiment, the position servo state using the sum signal I is directly switched to the position servo using the difference signal H, but the manner of change is not limited to direct switching to the difference signal H. After the objective lens 110 is moved to the neighborhood of the in-focus state by the position servo using the sum signal I, a predetermined constant current may be caused to flow into the focusing coil 112 to move the objective lens 110 to the in-focus state.

The fourth embodiment will be described in detail with reference to FIGS. 11 and 12.

Figure 11:
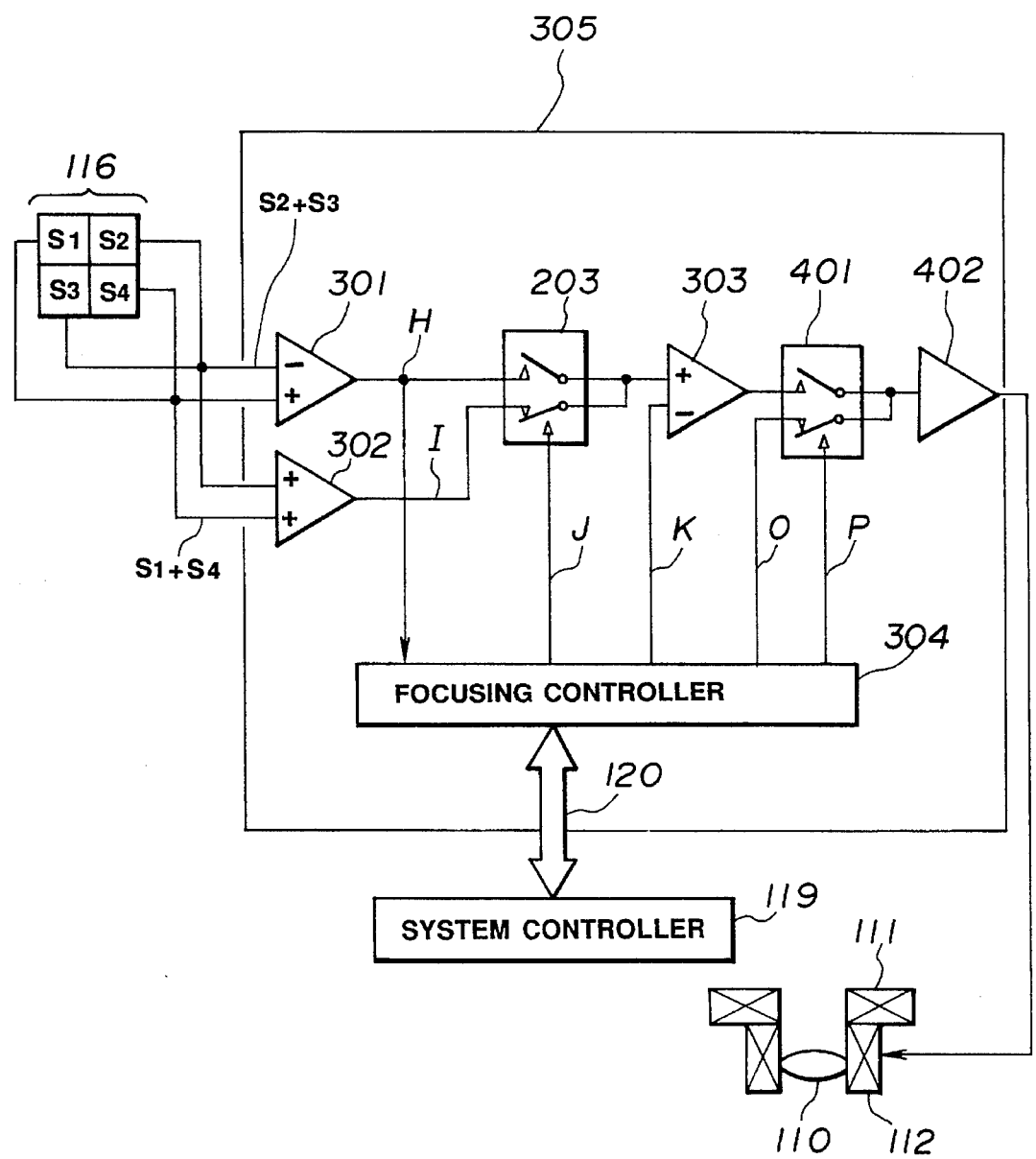
FIG. 11 is a view showing a fourth embodiment of an optical information recording-reproducing method and an apparatus using the method according to the present invention.

FIG. 11 is a schematic view showing the structure of a focusing control circuit 305. FIG. 12 shows various timing charts of the focusing control circuit 305 shown in FIG. 11.

In FIG. 11, reference numeral 401 designates an analog switch and reference numeral 402 designates a driver.

Prior to a time of $t_d$, the position servo state using the sum signal I operates similar to the first embodiment.

When the fact that the difference signal H reaches a value of $-V_s$ at a time of $t_d$ is detected, the change of the reference signal K (see FIG. 12C) is terminated.

Then, the analog switch 401 selects a signal O in accordance with a signal P at a time of $t_a$ (see FIGS. 12B and 12D). At the same time, the focusing controller 304 changes the signal O from zero (0) to a negative voltage. Hence, a current flows into the focusing coil 112 and the objective lens 110 is moved toward the in-focus position. At a time of $t_c$, the fact that the difference signal H comes to zero (0) is detected, and the output of the driver 306 is selected by the analog switch 401 in response to the signal P. As a result, the position servo using the difference signal H or the AF servo state is established. Thus, the draw-in of the AF servo is achieved.

The negative voltage mentioned above is preferably a value that is reached by adding a constant value to a current value, which flows into the focusing coil 112, during a period between $t_d$ and $t_a$, in consideration of possible vibrations.

This method is effective similar to the third embodiment, in a case where the inclination of the sum signal I is very small at the in-focus position. In the fourth embodiment, the servo is in an open state during a period between a time when the difference signal H reaches a value of $-V_s$, and a time thereafter when the difference signal H reaches zero (0). This distance or period is only around several tens of microns. Therefore, influences are small even if vibrations are imparted from outside.

Fifth Embodiment

In the first embodiment, an astigmatism method in which an S-shaped curve is obtained is adopted, but other methods can be applied. An off-axis method and so forth can also be applied to the present invention.

Sixth Embodiment

Although the servo is caused to be operative using the sum signal I of the sensor 116 for AF in the first embodiment, other methods can be utilized. If the apparatus performs AT, the same effect can be obtained by using a sum signal of the sensor 115 for AT.

Figure 13:
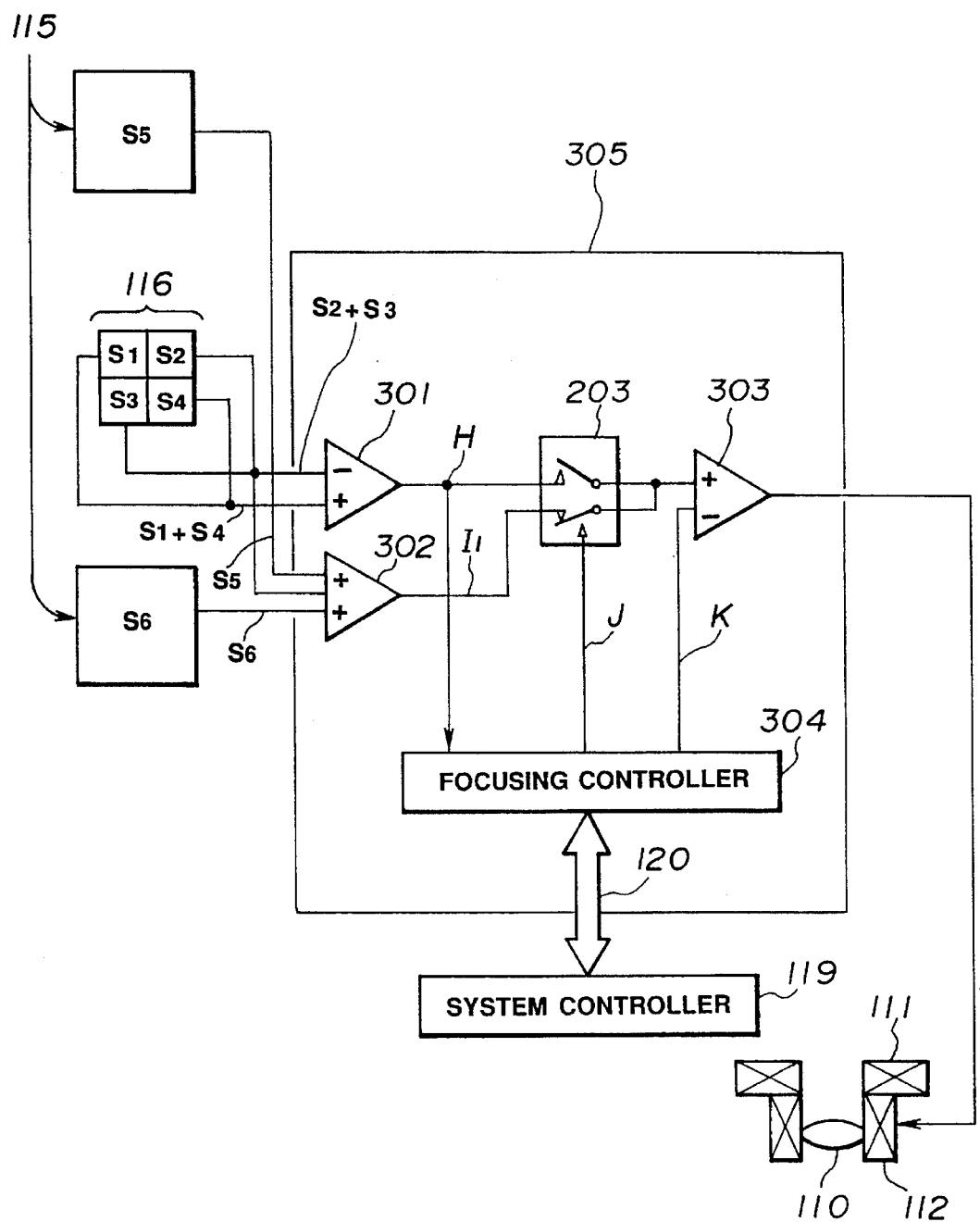
FIG. 13 is a view showing a sixth embodiment of an optical information recording-reproducing method and an apparatus using the method according to the present invention.

FIG. 13 shows the schematic structure of a focusing control circuit of the sixth embodiment. In FIG. 13, reference numeral 115 designates a photoelectric conversion element, and AT is conducted by using the output signal of the photoelectric conversion element 115. In the sixth embodiment, signals $S_5$ and $S_6$ of two sensors within the photoelectric conversion element 115 are added in the adder circuit 302. A signal $I_1$, is used to move the objective lens 110 to the neighborhood of the n-focus position, similar to the first embodiment. At this time, the signal $I_1$ varies similar to the sum signal I shown in FIG. 9B of the first embodiment, so that the same effect can be obtained.

Seventh Embodiment

In the first embodiment, in order to operate the servo, the sum signal of the sensor that receives reflected light of a light spot, to be used in the astigmatism method is used, but the servo operation is not limited thereto. For example, in an apparatus in which three light spots are applied to the recording medium and the AF signal is obtained from the center spot while the AT signal is obtained from the two spots both at opposite ends (i.e., a so-called three-spot method), it is effective to operate the servo by using the sum signal of the sensors that receive reflected lights from the three light spots. In particular, when this method is adopted, even if one spot is scanned on the recorded pit array or the tracking track for AT, the change in an amount of the sum signal is reduced to a third, and thus a noise component is diminished.

Figure 14:
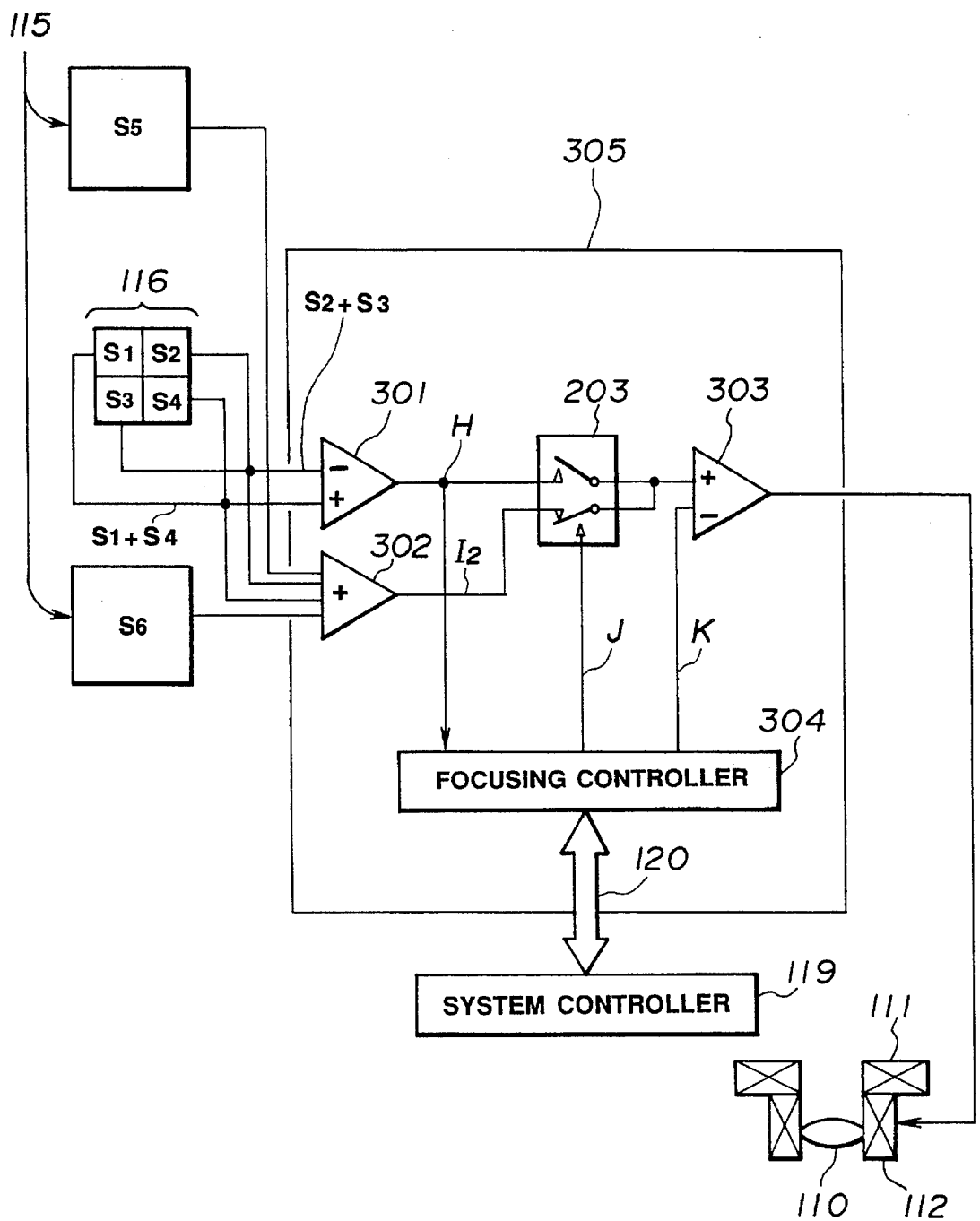
FIG. 14 is a view showing a seventh embodiment of an optical information recording-reproducing method and an apparatus using the method according to the present invention.
Figure 15:
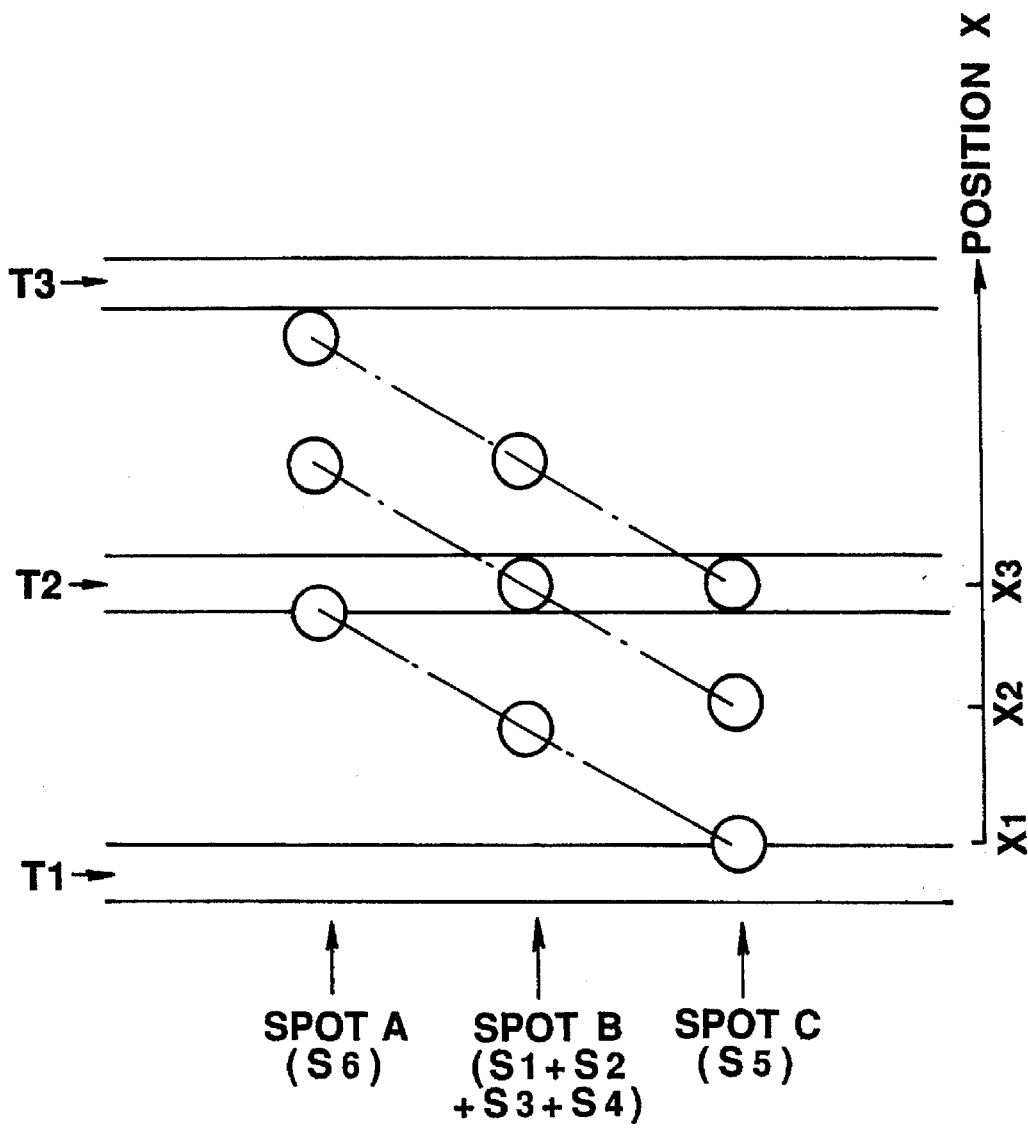
FIG. 15 is a view illustrating a positional relation between light spots and tracks in the seventh embodiment.

The seventh embodiment will be described in detail with reference to FIGS. 14, 15 and 16A–16B. FIG. 14 is a view showing the schematic structure of a focusing control circuit 305. In this structure, signals of the sensors 115 and 116, corresponding to three light spots, are added by an adder circuit 302. FIG. 15 shows a positional relation between three spots and tracking tracks. FIGS. 16A–16D show sensor signals corresponding to the three spots and the sum signal of the three.

As shown in FIG. 15, when viewed from left to right, the three spots A, B and C respectively correspond to signals $S_6$, $S_1+S_2+S_3+S_4$, and $S_5$.

Respective signals at the time when the three spots are scanned in a direction X on tracking tracks $T_1$, $T_2$ and $T_3$ become a half (½) when they are positioned right on the tracking tracks. FIGS. 15 and 16A–D respectively show the in-focus state.

In the position $X_1$, shown in FIGS. 15 and 16, spots A and C are respectively half located on the tracking tracks $T_2$ and $T_1$. Therefore, signals $S_6$ and $S_5$ respectively become a value of three quarters. The spot B is not brought into contact with the tracking track. Thus, the signal $S_1+S_2+S_3+S_4$ is equal to one (1). Similarly, in the position $X_2$, $S_1+S_2+S_3+S_4$ is equal to ½, and $S_5$ $S_6$ are respectively equal to 1, while in the position $X_3$, $S_5$ is equal to ½, and $S_1+S_2+S_3+S_4$ and $S_6$ are respectively equal to 1.

Figure 16A:
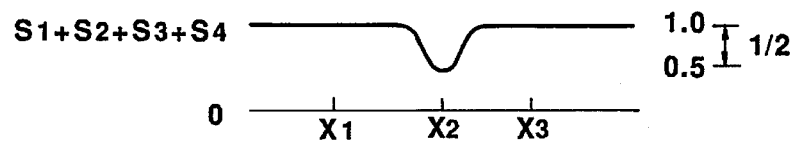
FIGS. 16A, 16B, 16C and 16D are respectively graphs illustrating changes in signals at different points of the apparatus shown in FIG. 14.
Figure 16B:
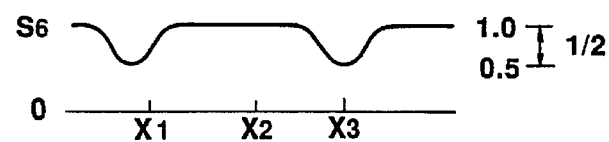
Figure 16C:
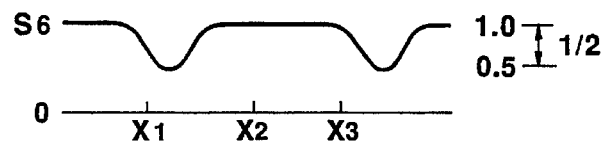
Figure 16D:
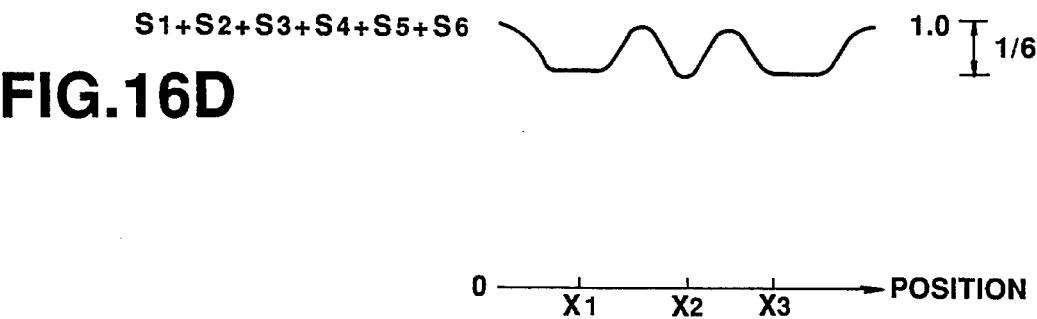

As shown in FIG. 16D, the change in an amount of a signal $S_1+S_2+S_3+S_4+S_5+S_6$, which is the sum signal of the sensors 115 and 116 and corresponds to the three spots, is ⅙ while as shown in FIGS. 16A–16C the changes in amounts of $S_1+S_2+S_3+S_4$, $S_5$ and $S_6$ are respectively ½. Thus, the former is a third of the latter. Therefore, as discussed above, this method is effective in decreasing a noise component.

Eighth Embodiment

In the seventh embodiment, all signals of the sensors 115 and 116 are added, but the method is not limited to this manner.

Figure 17:
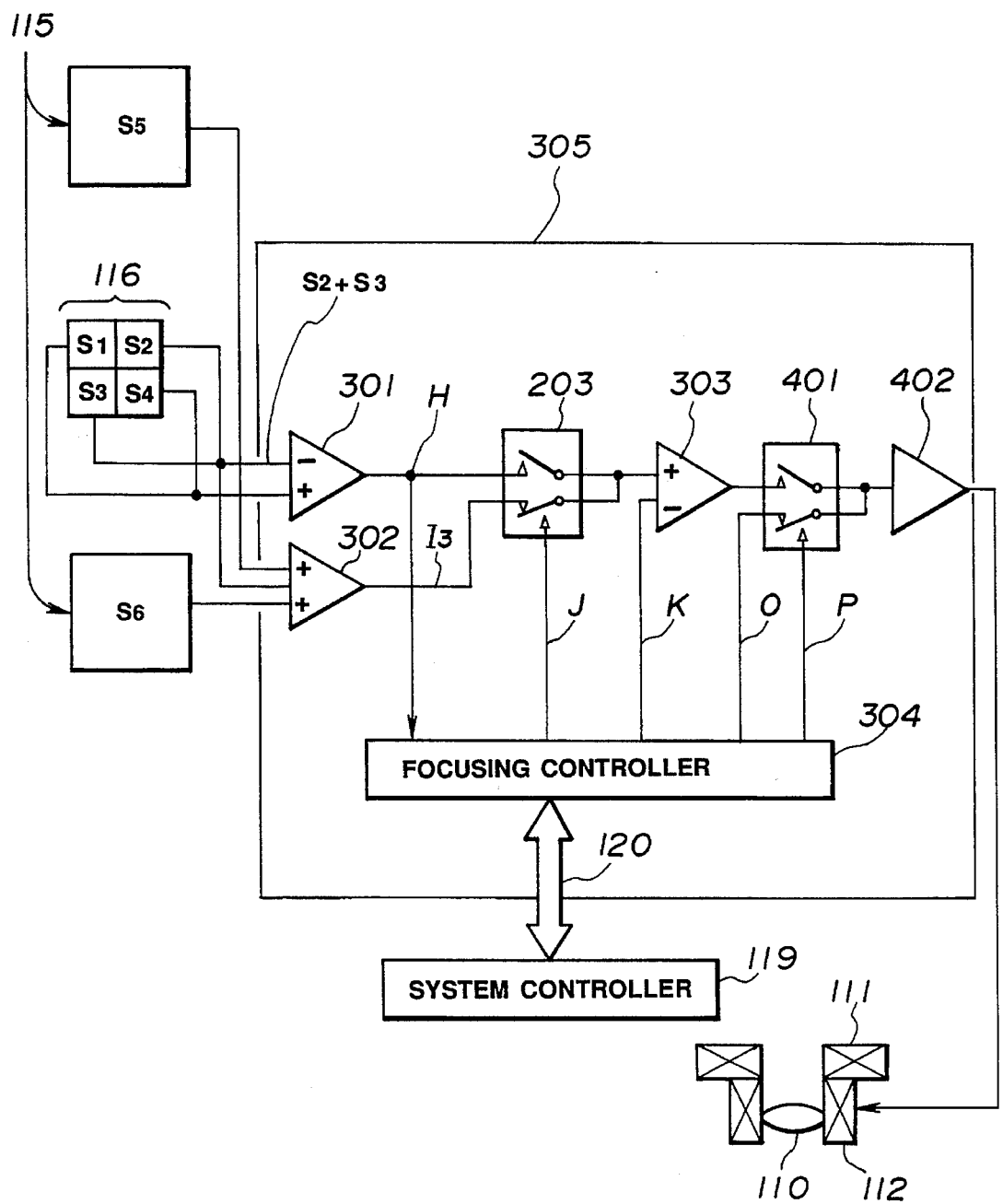
FIG. 17 is a-view showing an eighth embodiment of an optical information recording-reproducing method and an apparatus using the method according to the present invention.
Figure 18A:
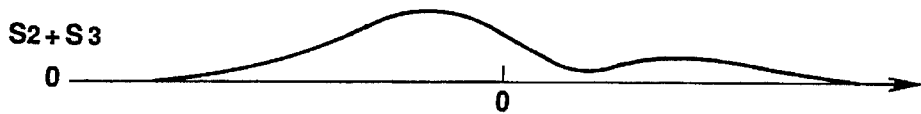
FIGS. 18A, 18B, 18C, 18D and 18E are respectively graphs illustrating changes in signals at different points of the apparatus shown in FIG. 17.
Figure 18B:
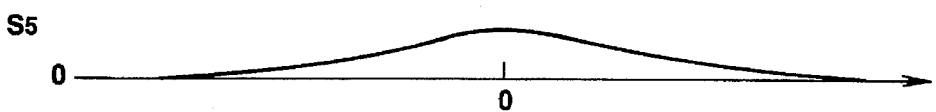
Figure 18C:
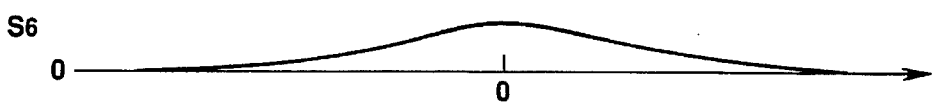
Figure 18D:
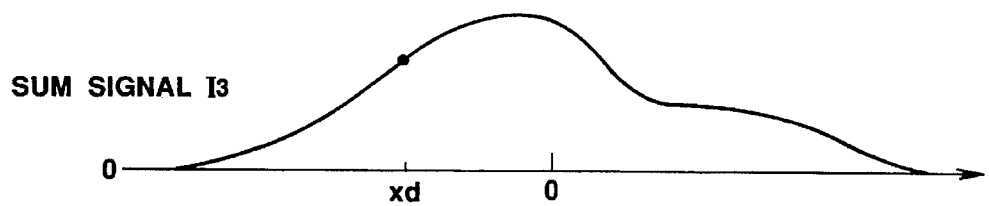
Figure 18E:
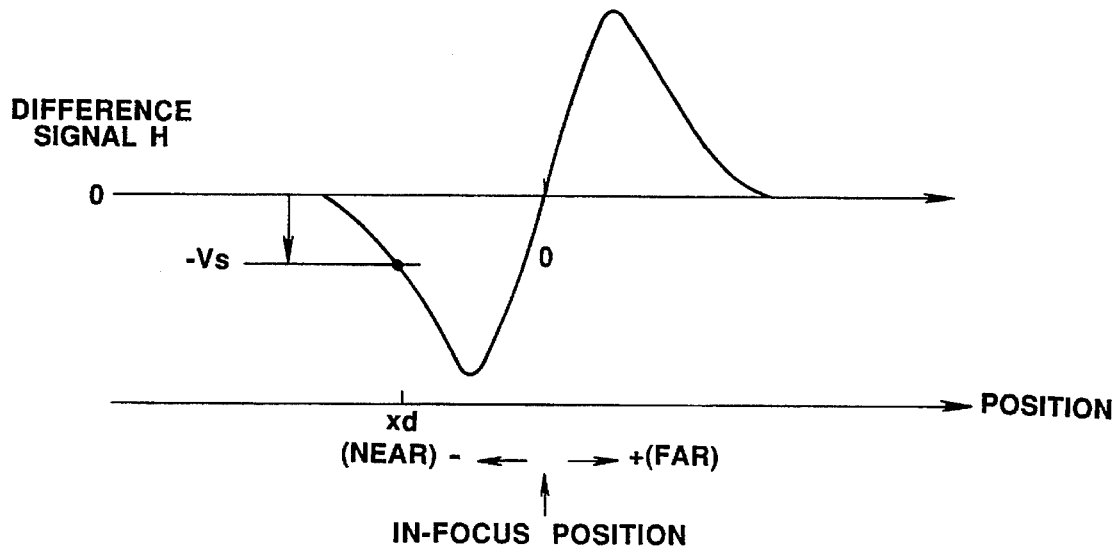

As shown in FIG. 17, $S_2+S_3$, $S_5$ and $S_6$ may be added. In this case, the signals vary as illustrated in FIGS. 18A–18E. As explained in the fourth embodiment, the objective lens 110 is moved to a position $X_d$ by the position servo that uses a sum signal $I_3$. After that, similar to the fourth embodiment, the objective lens 110 is moved toward the in-focus position by a constant current flowing into the focusing coil 112.

The feature of this method is that the decrease in inclination of the sum signal $I_3$ is small up to the position $X_d$, and thus the effect of the fourth embodiment can be obtained. Since the signal corresponding to a plurality of spots is used, the effect of the seventh embodiment can also be obtained.

Ninth Embodiment

Figure 19:
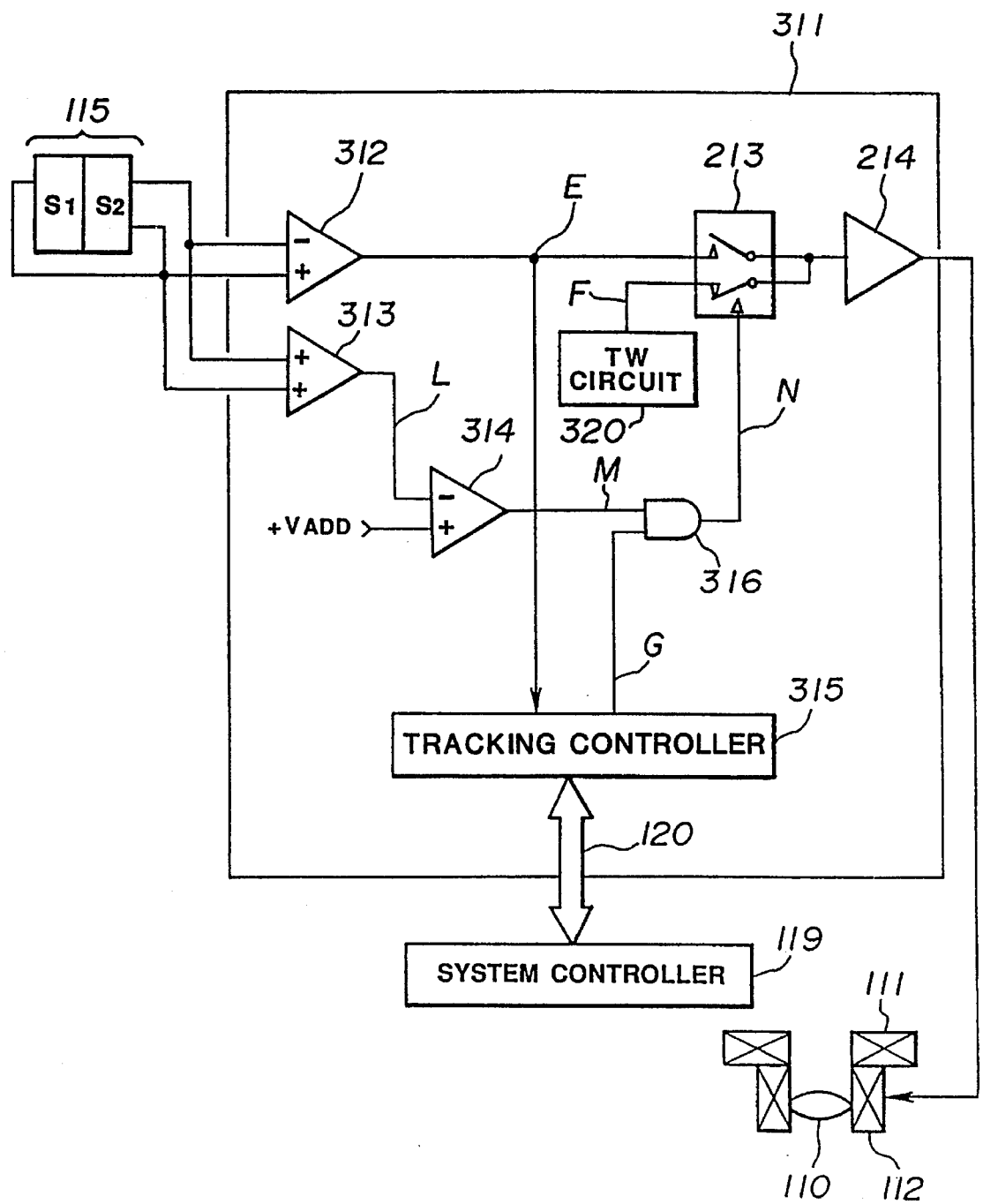
FIG. 19 is a view showing a ninth embodiment of an optical information recording-reproducing method and an apparatus using the method according to the present invention.

The ninth embodiment will be described with reference to FIGS. 19 to 23. FIG. 19 is a view showing the schematic structure of a tracking control circuit 311 that is a particular portion of an optical information recording-reproducing method and an apparatus using the method of the present invention. FIGS. 20, 21A–21C, 22 and 23 respectively illustrate timing charts of the tracking control circuit 311 shown in FIG. 19.

In FIG. 19, reference numeral 311 designates a tracking control circuit, and reference numeral 312 designates a subtracter circuit. Reference numeral 313 designates an adder circuit, and reference numeral 314 designates a comparator circuit. Reference numeral 315 designates a tracking controller and reference numeral 316 designates an AND circuit.

Figure 20:
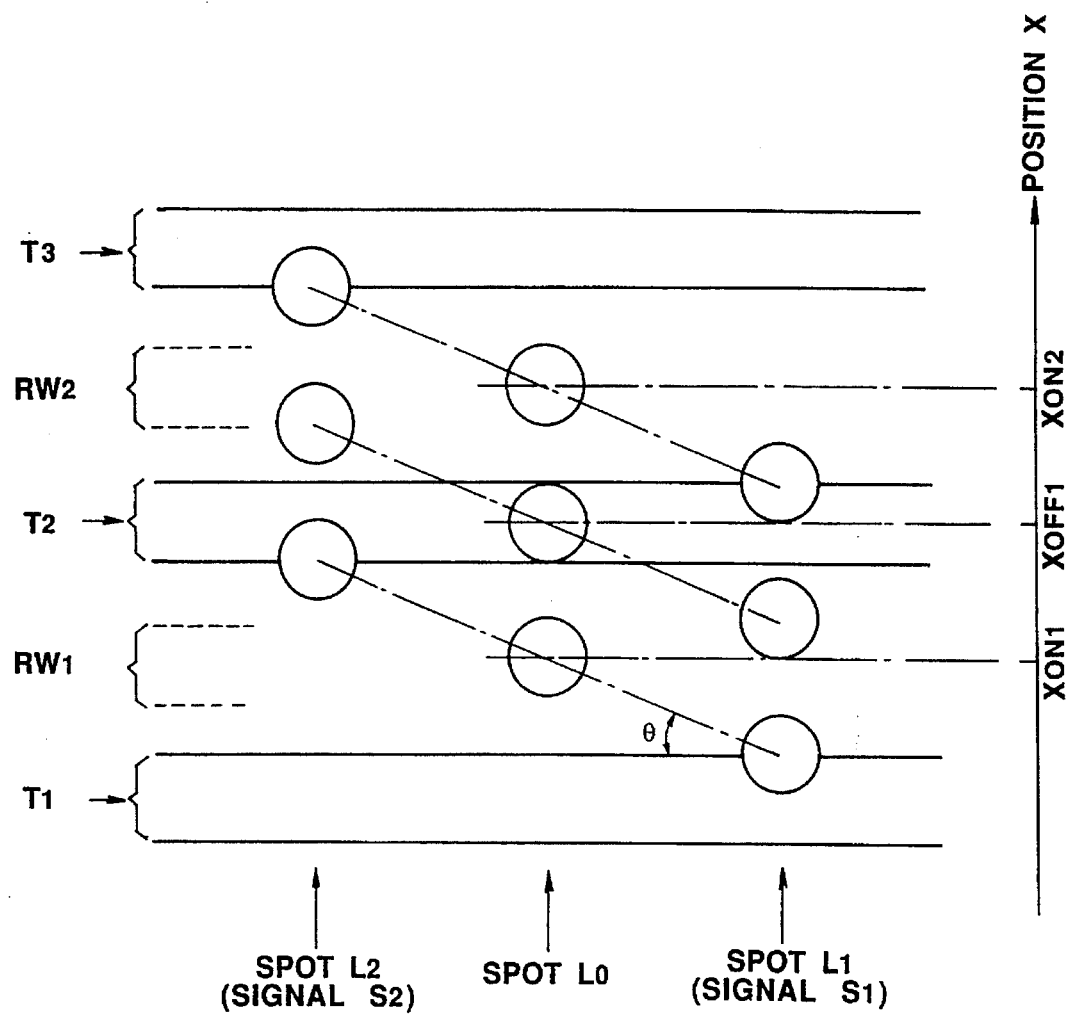
FIG. 20 is a view illustrating a positional relation between light spots and tracks in the ninth embodiment.

FIG. 20 shows a positional relation between the optical card 101 and light spots. In FIG. 20, $RW_1$ and $RW_2$ respectively designate recording-reproducing tracks on the optical card 101 and $T_1$, $T_2$ and $T_3$ respectively designate tracking tracks on the optical card 101. Further, the spot $L_0$ is a spot for recording-reproduction and AF, and spots $L_1$ (signal $S_2$) and $L_2$ (signal $S_1$) are two spots for AT. The recording-reproduction are performed by positioning the spot $L_0$ on the position $X_{ON1}$, namely, on the recording-reproducing track $RW_1$. At this time, a part of the spot $L_1$ is on the tracking track $T_1$ while a part of the spot $L_2$ is on the tracking track $T_2$.

Figure 21A:
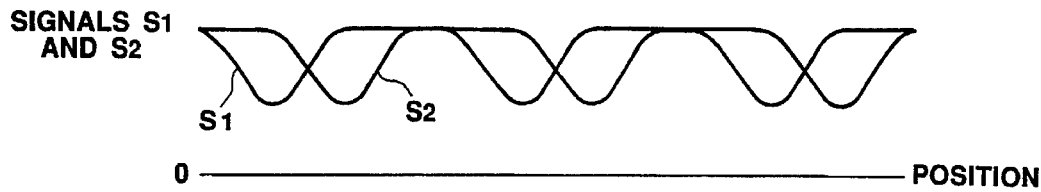
FIGS. 21A, 21B and 21C are respectively graphs illustrating changes in signals at different points of the apparatus shown in FIG. 19.
Figure 21B:
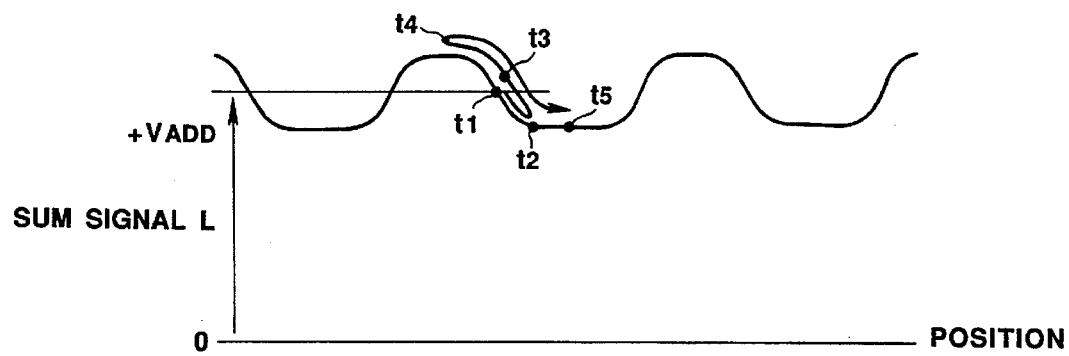
Figure 21C:
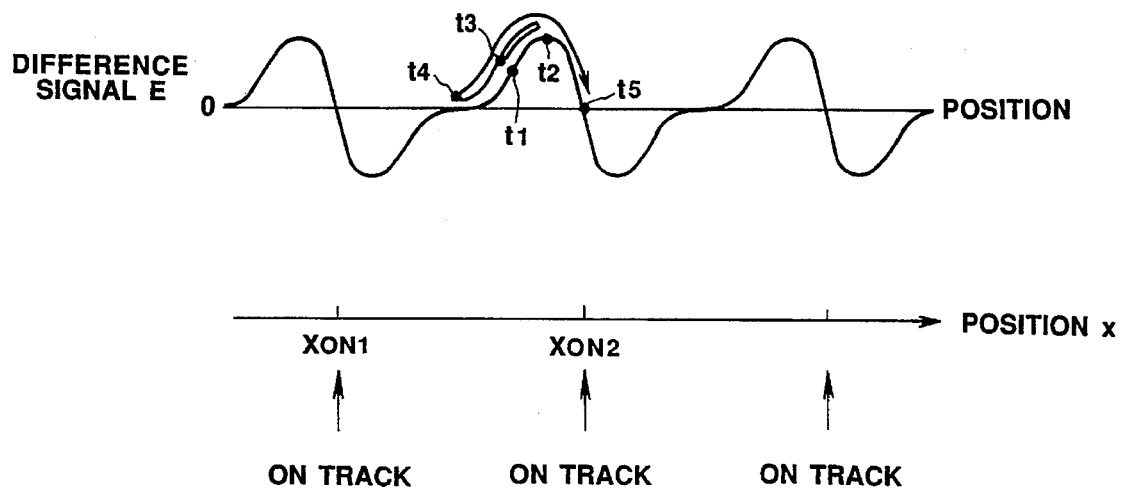

When the objective lens 110 is moved relative to the optical card in a tracking direction the signals $S_1$ and $S_2$ of the photoelectric conversion element 115 (divided sensor) vary. The sum signal L and the difference signal E vary as shown in FIGS. 21A–21C.

Figure 22:
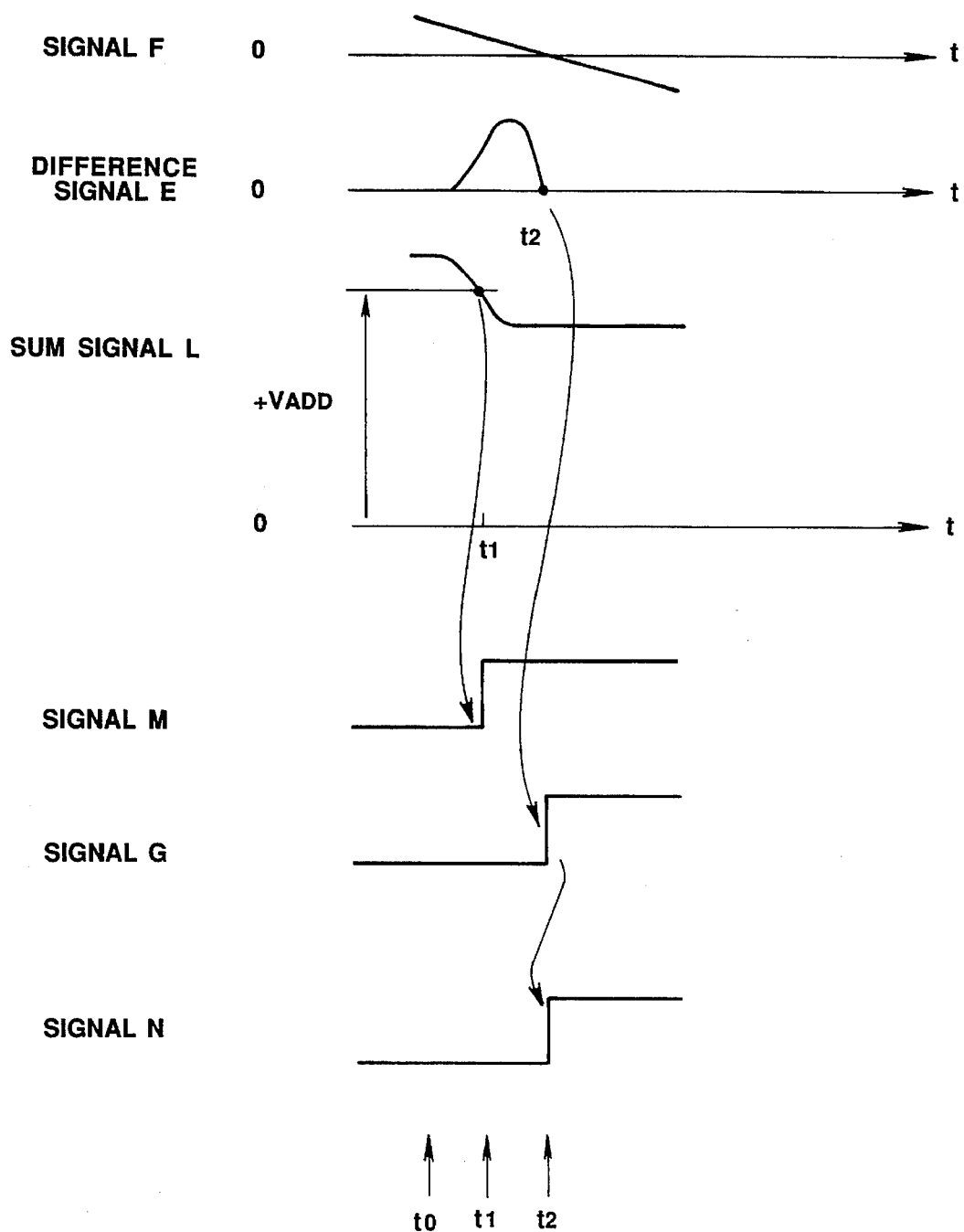
FIG. 22 is a view illustrating timing charts of different signals in the appparatus shown in FIG. 19.
Figure 23:
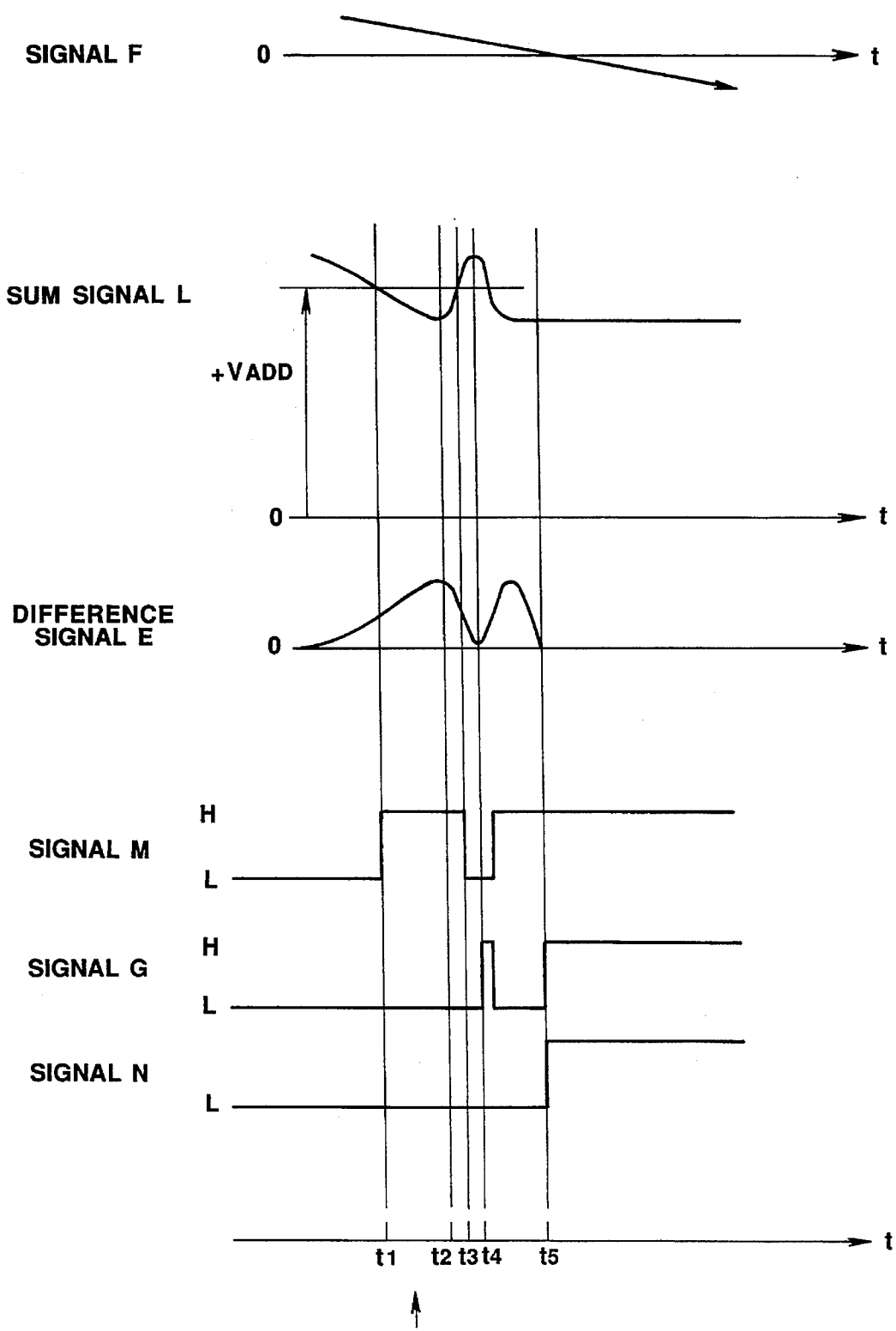
FIG. 23 is a view illustrating timing charts of different signals in the appparatus shown in FIG. 19.

The draw-in of AT servo is conducted according to a process shown in FIG. 22. Prior to a time of $t_0$, an analog switch 213 selects a triangle wave signal F from a triangle wave generating circuit or TW circuit 320 as shown in FIG. 19, and the objective lens 110 is moved in the tracking direction.

Then, at a time of $t_1$, the sum signal L becomes smaller than a comparison voltage $+V_{ADD}$, and hence the output signal M of the comparator circuit 314, shown in FIG. 19, becomes equal to ⌈H⌋. The tracking controller 315 detects the point where the difference signal E reaches zero (0), and the controller 315 changes the signal G to ⌈H⌋ at a time of $t_2$. At this time, the output signal N of the AND circuit 316 also changes to ⌈H⌋ since the signal M is also equal to ⌈H⌋. Hence, the analog switch 213 is switched to the E side to operate the AT servo. Thus, the draw-in of AT servo is achieved.

FIGS. 21A–C and 23 show what occurs when vibrations are imparted from outside. The sum signal L is smaller than the comparison voltage $+V_{ADD}$ at a time of $t_1$, and hence the signal M of the comparison circuit 314 comes to ⌈H⌋. If, however, the vibration occurs at a time of $t_2$ and the objective lens 110 is swayed in a reverse direction, the spot is derailed from the track and the sum signal L is larger than $+V_{ADD}$ at a time of $t_3$. Then, the difference signal E comes to zero (0) at a time of $t_4$. In the prior art apparatus, the AT servo is erroneously made operative at this time. In the ninth embodiment, however, since the sum signal L is larger than $+V_{ADD}$ at this time, the signal M is equal to ⌈L⌋. Therefore, the signal N is also equal to ⌈L⌋, and the servo is not yet made operative and hence the objective lens 110 continues to be moved. At a time of $t_5$, the spot is positioned on the track, and hence the signal M has already come to ⌈H⌋ and the difference signal E comes to zero (0). At this point, the AT servo is correctly made operative, and the draw-in of the AT servo is accurately attained.

Tenth Embodiment

In the ninth embodiment, the comparison of the sum signal is conducted using hardware, but this may be achieved using a CPU or software.

Eleventh Embodiment

In the ninth embodiment, the generation of the difference and sum signals is conducted using hardware, but this may be achieved using a CPU or software.

Twelfth Embodiment

In the ninth embodiment, the comparison level $+V_{ADD}$ of the sum signal is described as a fixed value, but this level is not limited thereto. For example, when the objective lens 110 is moved in a tracking direction, at a stage prior to the draw-in of AT servo, maximum and minimum values of the sum signal are stored and the comparison level may be set to a value that is equal to a center value between these stored values.

Thirteenth Embodiment

In the twelfth embodiment, the maximum and minimum values of the sum signal are stored, but other methods may be adopted. Another example will be described as a thirteenth embodiment.

Figure 25:
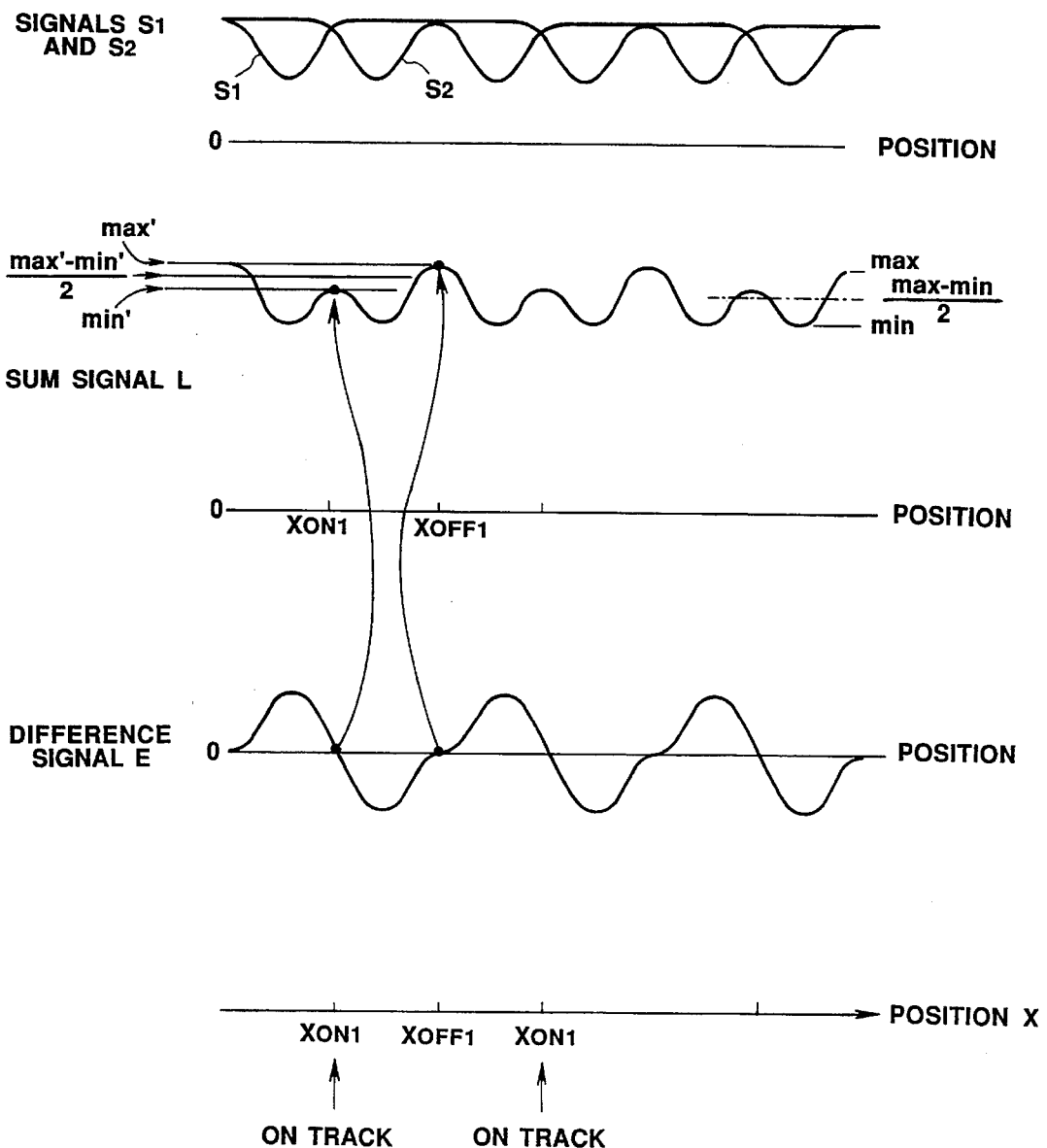
FIG. 25 is a graph illustrating changes in signals at different points of the thirteenth embodiment.

Similar to FIG. 21 of the ninth embodiment, FIG. 25 shows signals $S_1$ and $S_2$, sum signal L and difference signal E, which are respectively signals of the photoelectric conversion element 115, when the objective lens 110 is moved relative to the optical card 101 in the tracking direction.

Figure 24:
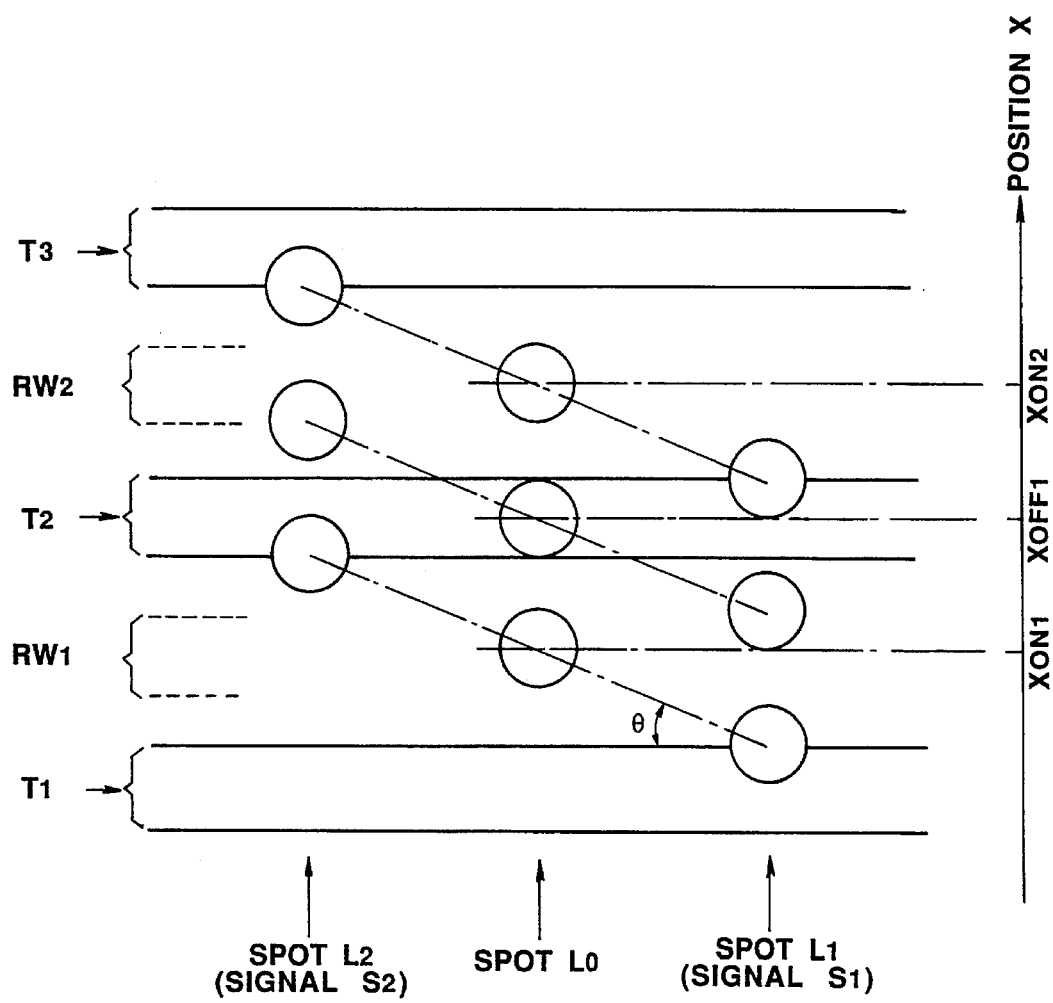
FIG. 24 is a view illustrating a positional relation between light spots and tracks in the thirteenth embodiment.

This example is different from FIG. 21 in that the phase of the signal $S_2$ differs from the phase of the signal $S_1$. The reason therefor is explained by the positional relation between the optical card 101 and spots illustrated in FIG. 24. The angle θ between the track and the line connecting the three spots comes to θ' and the degree of engagement of the spots $L_1$ and $L_2$ with the tracks $T_1$ and $T_2$ at the time when the spot $L_0$ is in the position $X_{ON1}$ differs, as compared with that of FIG. 20. This is possible due to the design or skew of the optical card 101.

In such a case, if $+V_{ADD}$ is set to a center value between maximum and minimum values as in the twelfth embodiment, the value is equal to (max–min)/2 indicated at the right side of the sum signal L in FIG. 25. In this state, a value of the sum signal L is larger than (max–min)/2 even at the position $X_{ON1}$, which is on the track, and therefore, the problem occurs in that the AT servo is not closed. In this case, the sum signal L is stored only at on-track and off-track times without always being stored. As shown at the left side of FIG. 25, the difference signal E is equal to zero (0) at the position $X_{ON1}$ (on-track time) and the position $X_{OFF1}$ (off-track time). Therefore, if the sum signal L is stored solely when the difference signal E is equal to zero (0), its maximum and minimum values are respectively equal to max' and min' as shown at the left side of FIG. 25. As a result, the center value becomes equal to (max'–min')/2 which is indicated at the left side of FIG. 25. Thus, the AT servo can be closed at the regular position $X_{ON1}$ since the value of the sum signal L is smaller than (max'–min')/2 at the position $X_{on1}$ that is on the track.

Fourteenth Embodiment

In the thirteenth embodiment, $+V_{ADD}$ is made equal to a center value between maximum and minimum values, but the value of $+V_{ADD}$ is not limited thereto.

Fifteenth Embodiment

In the ninth embodiment, the sum signal of the AT sensor is used for comparison, but other signals may be used. In the apparatus in which three spots are applied to the medium and AF and AT signals are respectively obtained from the center spot and the other two spots at both ends, as shown in FIG. 20, the same effect can be obtained by comparing signals of the sensor that receives a reflected light from the center spot to be used for AF.

Sixteenth Embodiment

In the ninth embodiment, an example in which the sum signal is reduced when the spot is located on the track, is shown, but other cases are possible. The same effect of the present invention can be obtained also in a case where the sum signal increases when the spot is on the track.

As described in the foregoing, according to the present invention, the draw-in of AF and AT can be accurately achieved even in a state in which vibrations are imparted from outside.

The individual components shown in outline or designated by blocks in the Drawings are all well-known in the information recording-reproducing arts and their specific construction and operation are not critical to the operation or best mode for carrying out the invention.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. An optical information recording-reproducing method in which a light spot is applied through an objective lens onto an optical information recording medium and the light spot is moved relative to the recording medium while focusing control is conducted so that at least one of recording, reproducing and erasing of information is effected on the recording medium, said method comprising the steps of:

receiving light reflected from the recording medium by a divided sensor;

adding up at least a portion of output signals of the divided sensor to generate a sum signal;

producing a driving signal for moving the objective lens in its optical axis direction;

moving the objective lens in its optical axis direction, when a focusing pull of the light spot is performed, based on a difference of the sum signal and the driving signal;

producing a focusing error signal from an output signal of the divided sensor;

performing focusing control of the optical spot on the basis of the focus error signal;

discriminating whether the optical spot is in an in-focus state or not; and selectively switching said moving step and said focusing control step on the basis of the result of the discrimination of said discriminating step at the time of a pull-in of the optical spot.

2. An optical information recording-reproducing method according to claim 1, wherein said discriminating step comprises the steps of:

comparing the focusing error signal with a predetermined value; and discriminating whether the objective lens is in a focus state or not on the basis of a result of said comparing step.

3. An optical information recording-reproducing method in which a light spot is applied through an objective lens onto an optical information recording medium, which has a plurality of tracks, and the light spot is moved relative to the recording medium while tracking control is conducted so that at least one of recording, reproducing and erasing of information is effected on the recording medium, said method comprising the steps of:

receiving light reflected from the recording medium by a divided sensor;

adding up at least a portion of output signals of the divided sensor to generate a sum signal;

comparing the sum signal with a predetermined value;

generating a tracking error signal in accordance with the output signals of the divided sensor;

comparing the tracking error signal with a predetermined value;

performing a tracking pull on the basis of the comparison results of each of said comparing steps; and controlling the tracking of the light spot based on the tracking error signal after the tracking pull has been completed.

4. An optical information recording-reproducing method according to claim 3, wherein the predetermined value is equal to zero.

5. An optical information recording-reproducing apparatus in which a light spot is applied through an objective lens onto an optical information recording medium, and the light spot is moved relative to the recording medium while focusing control is conducted so that at least one of recording, reproducing and erasing of information is effected on the recording medium, said apparatus comprising:

a divided sensor for receiving light reflected from the recording medium and for producing output signals;

adding means for adding up at least a portion of the output signals of said divided sensor to generate a sum signal;

driving signal generating means for generating a predetermined driving signal for moving the objective lens in its optical axis direction;

differential signal generating means for generating a differential signal by determining a difference between the sum signal and the driving signal;

moving means for moving the objective lens in its optical axis direction on the basis of the differential signal at the time of a pull-in of the light spot;

focusing error signal generating means for generating a focusing error signal from the output signals of said divided sensor;

focusing control means for focusing controlling said objective lens so that the light spot is in an in-focus state on the recording medium by using the focusing error signal;

discriminating means for discriminating whether the light spot is in an in-focus state or not; and means for selectively operating said moving means and said focusing control means on the basis of the discrimination by said discriminating means at the time of a pull-in of the light spot.

6. An optical information recording-reproducing apparatus in which a light spot is applied through an objective lens onto an optical information recording medium, which has a plurality of tracks, and the light spot is moved relative to the recording medium while a tracking control is conducted so that at least one of recording, reproducing and erasing of information is effected on the recording medium, said apparatus comprising:

a divided sensor for receiving light reflected from the recording medium and for producing output signals;

sum signal generating means for adding up at least a portion of the output signals of said divided sensor to generate a sum signal;

tracking error signal generating means for generating a tracking error signal from the output signals of said divided sensor;

tracking control means for tracking controlling the objective lens so that the light spot is located on the basis of the tracking error signal;

first comparing means for comparing the sum signals with a predetermined value;

second comparing means for comparing the tracking error signal with a predetermined value; and tracking pull means for performing a tracking pull in accordance with the comparison results of said first and second comparing means.

7. An optical information recording-reproducing apparatus according to claim 6, wherein the predetermined value is equal to zero.

* * * * *

UNITED STATES PATENT AND TRADEMARK OFFICE
CERTIFICATE OF CORRECTION

PATENT NO. : 5,475,660
DATED : December 12, 1995
INVENTOR(S) : Satoshi Shikichi

It is certified that error appears in the above-indentified patent and that said Letters Patent is hereby corrected as shown below:

ON THE COVER PAGE:

Under "Foreign Application Priority Data":

"Feb. 25, 1992 [JP] Japan .... 5-038021" should read --Feb. 25, 1992 [JP] Japan .... 4-038021--.

COLUMN 2:

Line 30, "card I01" should read --card 101--.

COLUMN 4:

Line 25, "relatively" should read --relative--.

COLUMN 7:

Line 15, "EMBODIMENT" should read --EMBODIMENTS--.

Signed and Sealed this

Twenty-first Day of May, 1996

Attest:

BRUCE LEHMAN

*Attesting Officer*    *Commissioner of Patents and Trademarks*